(12) United States Patent
Schroeter et al.

(10) Patent No.: US 12,293,507 B2
(45) Date of Patent: May 6, 2025

(54) METHODS AND SYSTEMS FOR VARNISH ANALYSIS OF STATOR IMAGES

(71) Applicant: Ford Global Technologies, LLC, Dearborn, MI (US)

(72) Inventors: Robert Schroeter, Livonia, MI (US); Seth Avery, Livonia, MI (US); Chris Wolf, Ann Arbor, MI (US); Jackson Lenz, Dearborn, MI (US); Boratha Tan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 423 days.

(21) Appl. No.: 17/937,658

(22) Filed: Oct. 3, 2022

(65) Prior Publication Data

US 2024/0112319 A1    Apr. 4, 2024

(51) Int. Cl.
*G06T 7/00* (2017.01)

(52) U.S. Cl.
CPC .. *G06T 7/0004* (2013.01); *G06T 2207/20081* (2013.01); *G06T 2207/20084* (2013.01); *G06T 2207/30164* (2013.01)

(58) Field of Classification Search
CPC ......... G06T 7/0004; G06T 2207/20081; G06T 2207/20084; G06T 2207/30164
See application file for complete search history.

(56) References Cited

U.S. PATENT DOCUMENTS

| | | | |
|---|---|---|---|
| 8,275,558 B2 | 9/2012 | Reed et al. | |
| 9,349,087 B2 | 5/2016 | Cleary | |
| 10,059,061 B2 | 8/2018 | Burns et al. | |
| 2004/0120571 A1 | 6/2004 | Duvdevani et al. | |
| 2011/0098984 A1* | 4/2011 | Lape | G06F 30/00 703/2 |
| 2017/0277979 A1 | 9/2017 | Allen et al. | |
| 2021/0374925 A1 | 12/2021 | Finlayson et al. | |
| 2024/0106310 A1* | 3/2024 | Zhang | H02K 15/12 |
| 2024/0111276 A1* | 4/2024 | Schroeter | G05B 19/41875 |
| 2024/0112350 A1* | 4/2024 | Schroeter | G06T 7/0004 |
| 2024/0112351 A1* | 4/2024 | Schroeter | G06V 10/82 |
| 2025/0010483 A1* | 1/2025 | Cristache | B25J 9/1697 |

OTHER PUBLICATIONS

Schroeter, R et al., "Methods and Systems for Non-Destructive Evaluation of Stator Insulation Condition," U.S. Appl. No. 17/937,644, filed Oct. 3, 2022, 84 pages.

* cited by examiner

*Primary Examiner* — Bobbak Safaipour
(74) *Attorney, Agent, or Firm* — David Kelley; McCoy Russell LLP

(57) ABSTRACT

Methods and systems are provided for an insulation system of a stator. In one example, a method may include receiving images of the stator at a processor of a computing system and processing the images by converting the images to one or more of cluster-only images and binary masks. The images may be fed to an artificial intelligence (AI) model to obtain one or more of varnish estimates and void estimates to generate a training dataset which may be used to train a deep learning tool to estimate varnish fill percentages from the images and display the varnish fill percentages at a display device.

20 Claims, 19 Drawing Sheets

| Inside Paper | Slot # | Surface Area (mm²) | Varnish Area (mm²) | Percent Fill |
|---|---|---|---|---|
| Twist | 2 | 8.35 | 7.09 | 84.9 |
| | 18 | 8.35 | 7.55 | 90.4 |
| | 33 | 8.35 | 8.05 | 96.4 |
| Crown | 2 | 8.35 | 8.15 | 97.6 |
| | 18 | 8.35 | 7.35 | 88.0 |
| | 33 | 8.35 | 8.10 | 97.0 |
| Center | 2 | 8.35 | 7.27 | 87.1 |
| | 18 | 8.35 | 6.94 | 83.2 |
| | 33 | 8.35 | 7.43 | 89.0 |
| Average | | 8.35 | 7.55 | 90.4 |
| Min | | 8.35 | 6.94 | 83.2 |
| Max | | 8.35 | 8.15 | 97.6 |

FIG. 10

METHODS AND SYSTEMS FOR VARNISH ANALYSIS OF STATOR IMAGES

FIELD

The present description relates generally to methods and systems for evaluating a condition of a stator insulation system.

BACKGROUND/SUMMARY

Electric traction motors, e.g., electric motors or electric machines, may be used to enable vehicle propulsion. In some examples, electric motors may also be operated to regenerate energy, thereby enabling recharging of energy storage devices and reducing fuel consumption in, for example, hybrid electric vehicles. An electromagnetic circuit of an electric traction motor may include a stator which is a stationary component of the circuit configured to interact with a rotor to drive motion of the rotor. For example, the stator core may support conductive windings which generate a rotating magnetic field that causes the rotor to rotate within the stator.

The conductive windings may be coupled to the stator by threading of the windings through slots formed along an inner surface of the stator. To mitigate electrical shorting and degradation of the windings resulting from exposure to moisture and vibrations, and to encapsulate and immobilize end turns of the windings, the stator may be configured with an insulation system that insulates the windings. The insulation system may include a heat tolerant, electrically isolating material applied to the windings as a coating within the slots. The coating may be a varnish formed of a resin such as an epoxy or an alkyd that is applied during manufacturing of the stator.

Various methods for applying the varnish are possible, including dipping the windings in varnish and curing in an oven, trickle varnishing, vacuum pressure impregnation, etc. A condition of the resulting varnish coating the windings within the slots, e.g., a thickness, continuity, and uniformity, may affect a performance and useful life of the stator. Evaluation of the condition of the varnish coating after application may therefore be desirable for manufacturing quality control but efficient assessment of the condition of the varnish coating may be challenging due to a location of the varnish coating within the slots of the stator. Conventional methods for testing winding insulation, such as insulation resistance tests, may confirm that the coating is continuous but does not provide information regarding thickness and uniformity. In order to reliably verify the varnish coating condition, destructive techniques may be demanded, such as cutting a sacrificial stator into pieces to visually examine the varnish coating within the stator's inner surfaces. Such verification protocols may be costly, time consuming, and prone to wide variations in accuracy. A more efficient, robust method for analyzing varnish coating of windings within the stator slots is therefore desirable.

In one example, the issues described above may be addressed by a method for automatically analyzing images of a stator, the method including receiving images of the stator at a processor of a computing system, the images depicting cross-sections of the stator, and processing the images using deep learning algorithms by cropping and filtering a region of the images corresponding to slots of the stator and converting the images to one or more of cluster-only images and binary masks. The one or more of the cluster-only images and binary masks may be fed to an artificial intelligence (AI) model implemented at the processor to obtain one or more of varnish estimates and void estimates from the AI model to generate a training dataset. The training dataset may be used to train a deep learning tool to estimate varnish fill percentages from the images and display the varnish fill percentages at a display device. In this way, the varnish coating within stator slots may be evaluated using reproducible and reliable processes that reduces analysis time and human error.

As one example, a color distribution in fluorescence images of both longitudinal (e.g., axial) and transverse sections of the stator may be analyzed using artificial intelligence (AI) algorithms and image processing techniques. Analysis via the AI algorithms allows identification of varnish regions in the images and/or voids present in the varnish based on signatures in the color distribution of the fluorescence images that may not be detectable to the human eye. A fill percentage for the slots may be generated within a shorter time frame and with less variability than conventional methods relying on visual inspection. As a result, less labor and reliance on manual processing and inspection of the stator sections is demanded, enabling faster and more robust quality control.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 10 shows an example of a report which may be output by a deep learning tool for displaying estimated fill percentages from images.

DETAILED DESCRIPTION

The following description relates to systems and methods for assessing a condition of an insulation system of a stator. The insulation system may include a varnish that coats the stator windings within slots of the stator. A state of the varnish may be determined by acquiring images of the stator and processing the images using a deep learning tool configured with a convolutional neural network (CNN) trained to estimate a fill percentage of the varnish at the stator slots, where the fill percentage represents how much of a surface of a selected slot is coated by the varnish. A process for estimating the fill percentage of varnish in a stator is depicted as a block diagram in FIG. 1. The stator may be configured with slots distributed along an inner surface of the stator, as shown in an example of the stator in FIGS. 2A-2B. A cross-sectional view of the stator is illustrated in FIG. 3A and a magnified view of a portion of the stator is shown in FIG. 3B.

Figure 4:
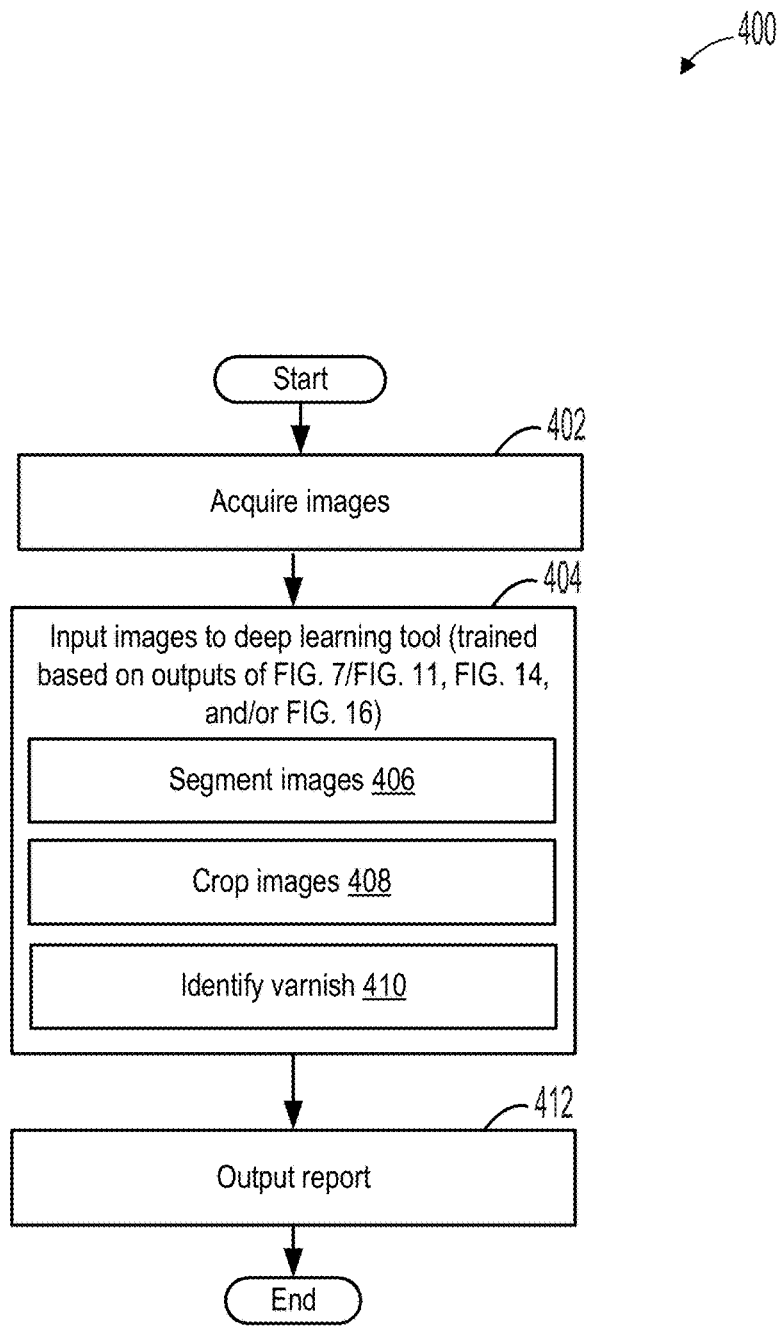
FIG. 4 shows an example of a process for analyzing varnish in stator section images using a deep learning tool implemented at a computing system.
Figure 5:
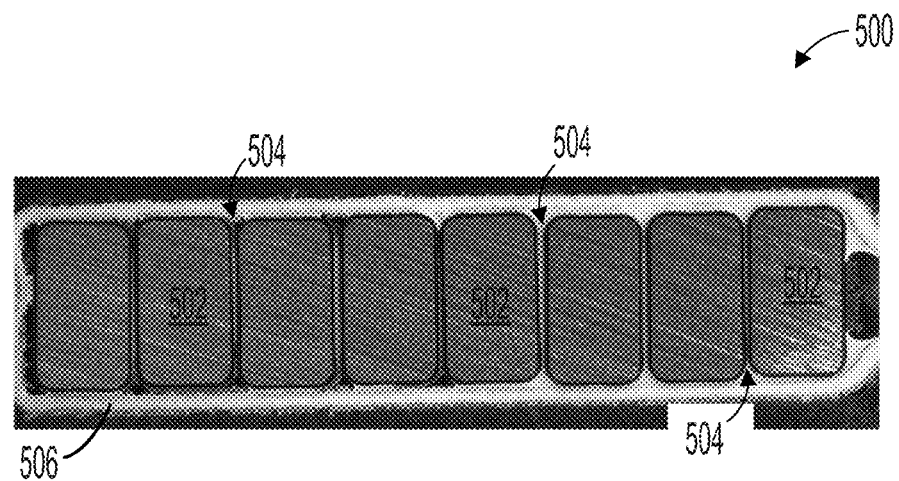
FIG. 5 shows an example of an image of windings from a transverse section of a stator.
Figure 6:
FIG. 6 shows an example of an image of an axial section of a stator.

An example of a method for automatically processing and analyzing the images for varnish using the deep learning tool is depicted in FIG. 4. The deep learning tool may output a report, such as an exemplary report shown in FIG. 10. The method of FIG. 4 may be applied to images of both transverse cross-sections and axial (e.g., longitudinal) cross-sections of the stator, examples of which are shown in FIGS. 5 and 6, respectively. The transverse cross-sections provide cross-sectional images of the stator windings for processing and analysis while the axial cross-sections provide views of a surface of the stator core that forms one side of a slot for processing and analysis.

Figure 7:
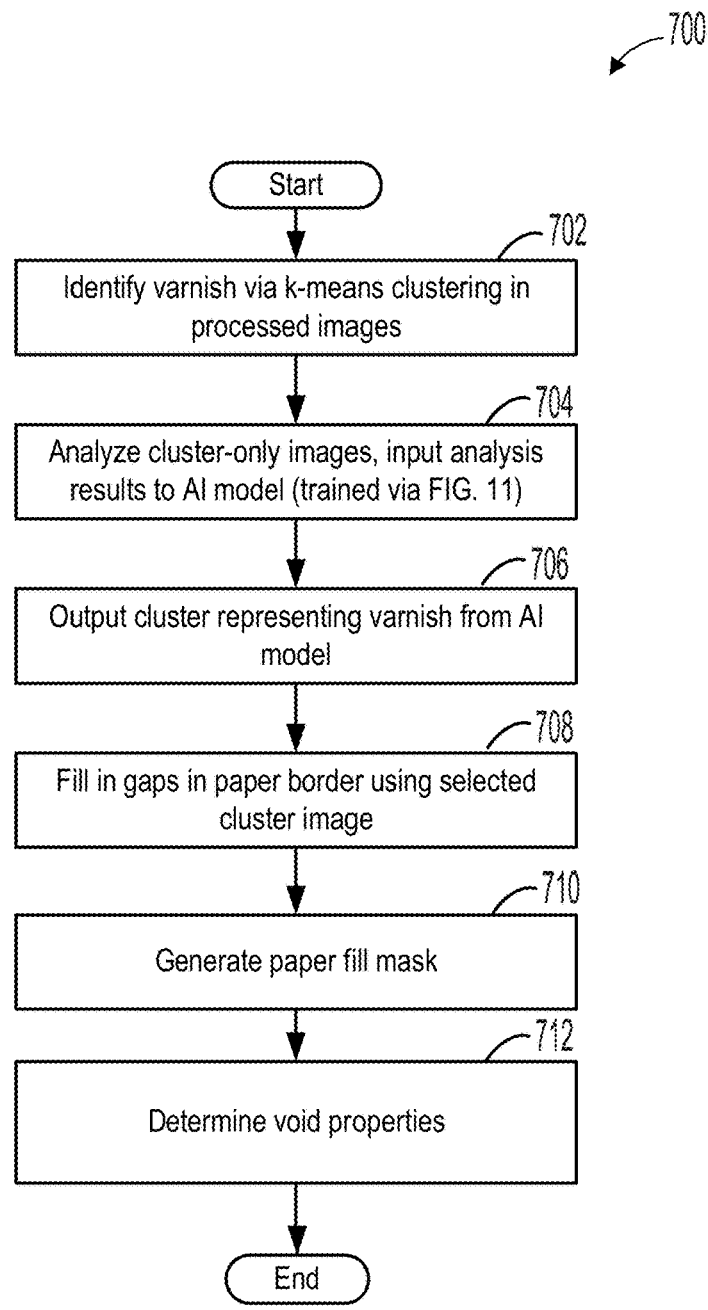
FIG. 7 shows an example of a method for processing and analyzing images to train an AI model via a first technique.
Figure 8:
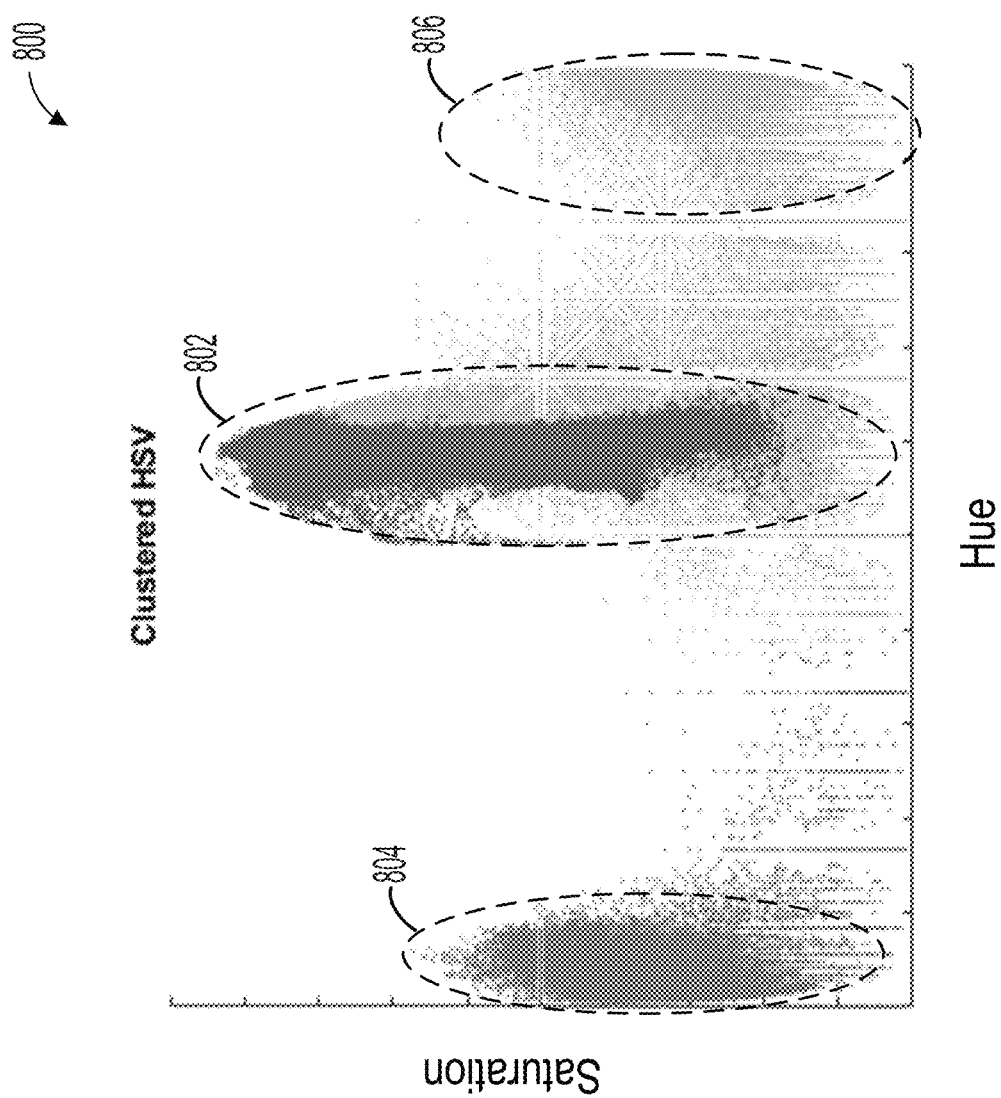
FIG. 8 shows an example of a plot of hue saturation value (HSV) color space clusters used in the first technique of FIG. 7.
Figure 9A:
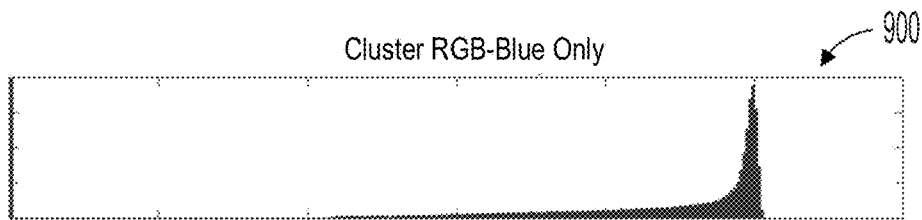
FIGS. 9A-9E shows a series of graphs plotting image parameters for the images according to the first technique of FIG. 7.
Figure 9B:
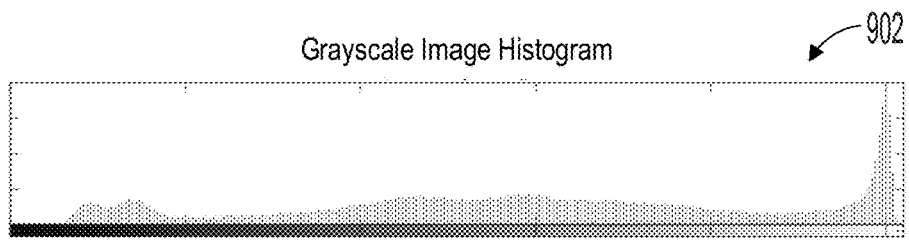
Figure 9C:
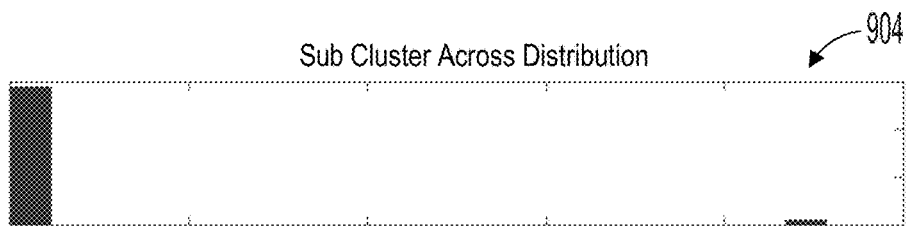
Figure 9D:
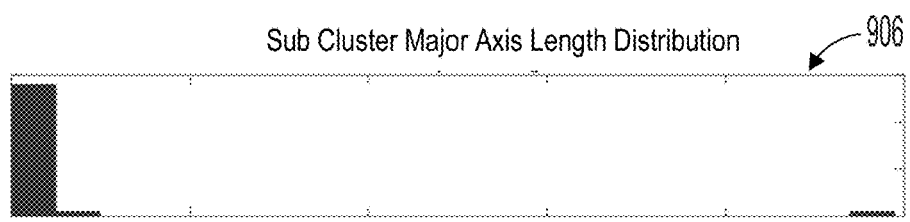
Figure 9E:
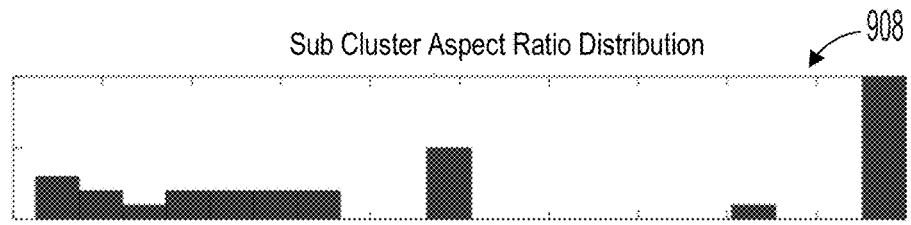
Figure 12:
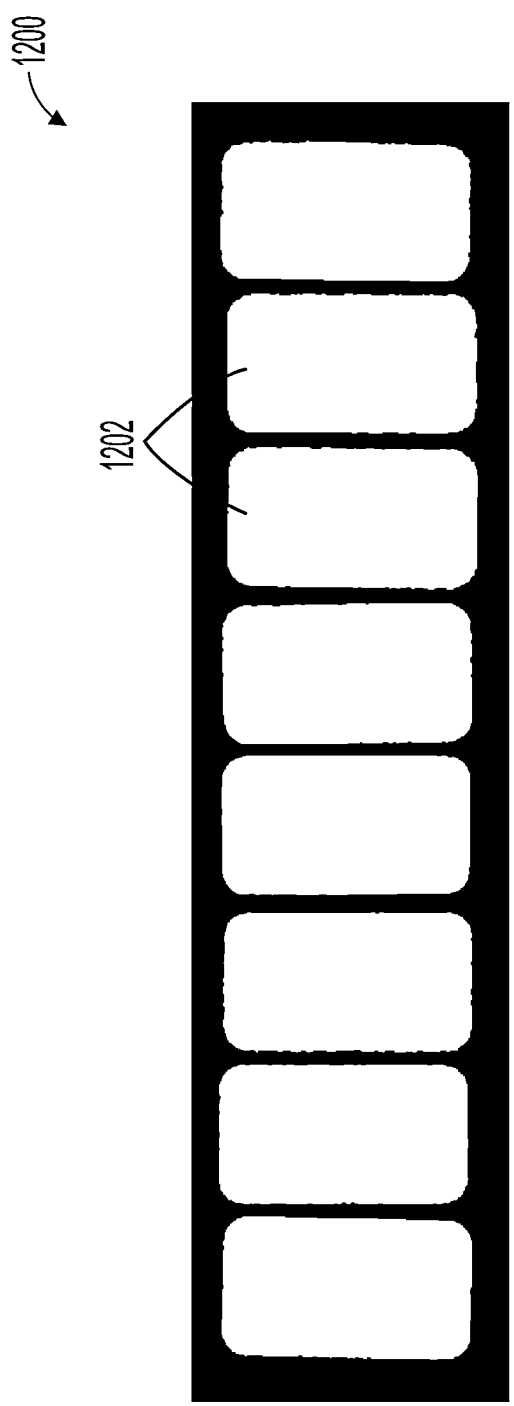
FIG. 12 shows an example of a binary mask generated based on the image of FIG. 5 according to the first technique of FIG. 11.
Figure 13:
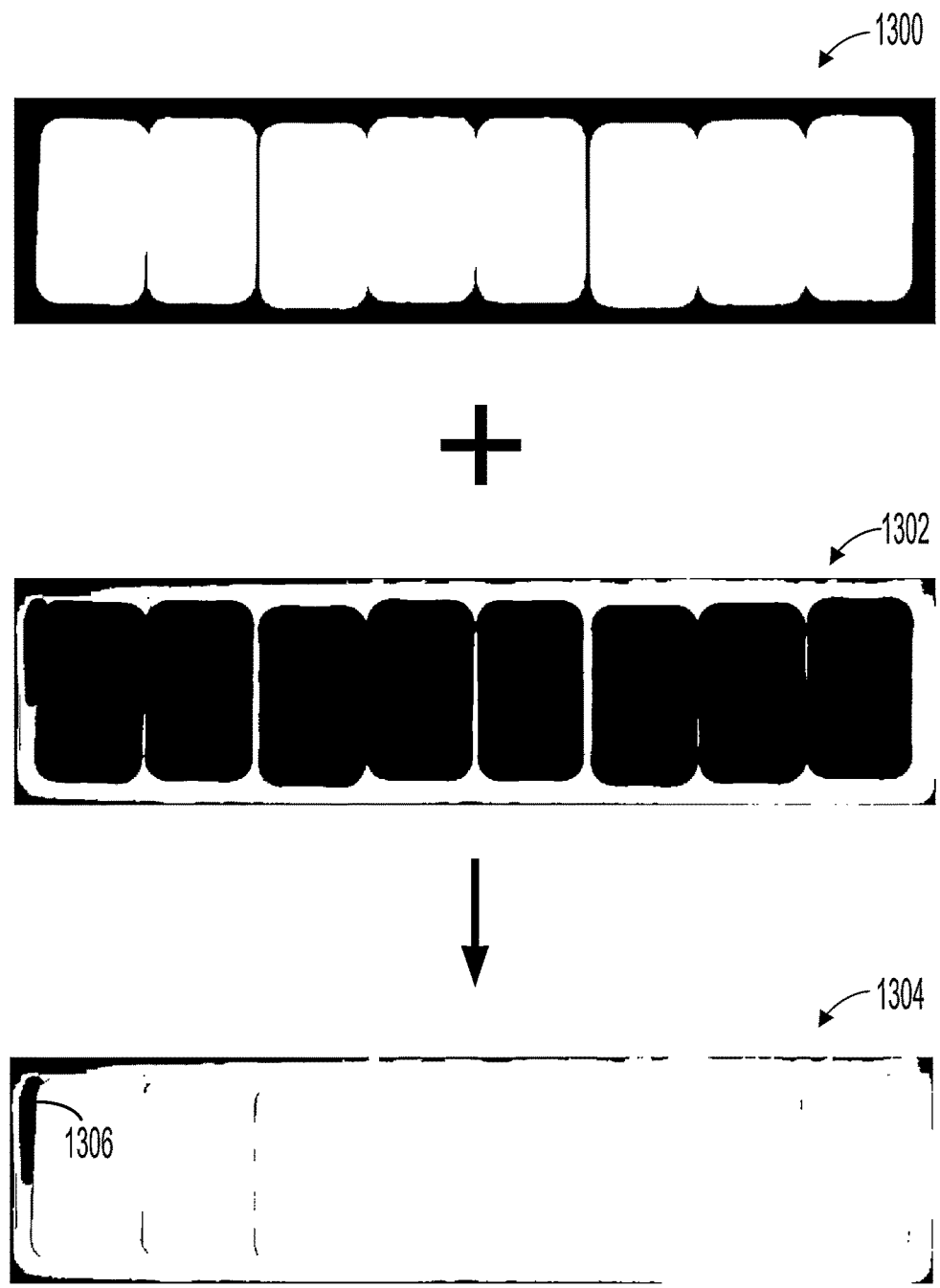
FIG. 13 shows an example of void detection from the binary mask of FIG. 12 according to the first technique of FIG. 11.

The deep learning tool may be trained based on outputs from one or more training techniques to estimate the fill percentage of the images, where the training technique may be applied based on cross-section type and accuracy, which may be determined by comparison of results. An example of a method for processing the images of the transverse cross-sections of the stator is depicted in FIG. 7, where the processed images may be used to train an AI model, which may be a machine learning model, via a method depicted in FIG. 11. Exemplary data used in the method of FIG. 7 is shown in FIGS. 8-9E. The method depicted in FIG. 7 may include inputting data to an AI model in FIG. 11 to identify voids in varnish from the images, where the AI model may be trained according to a first technique that relies on color distribution analysis of the images after the images are processed. The first technique may rely on transformation of the images into binary masks and application of an image parameter threshold for analysis of varnish and identification of voids in the varnish. Examples of image conversions generated in the second technique and used for varnish analysis are depicted in FIGS. 12-13.

Figure 14:
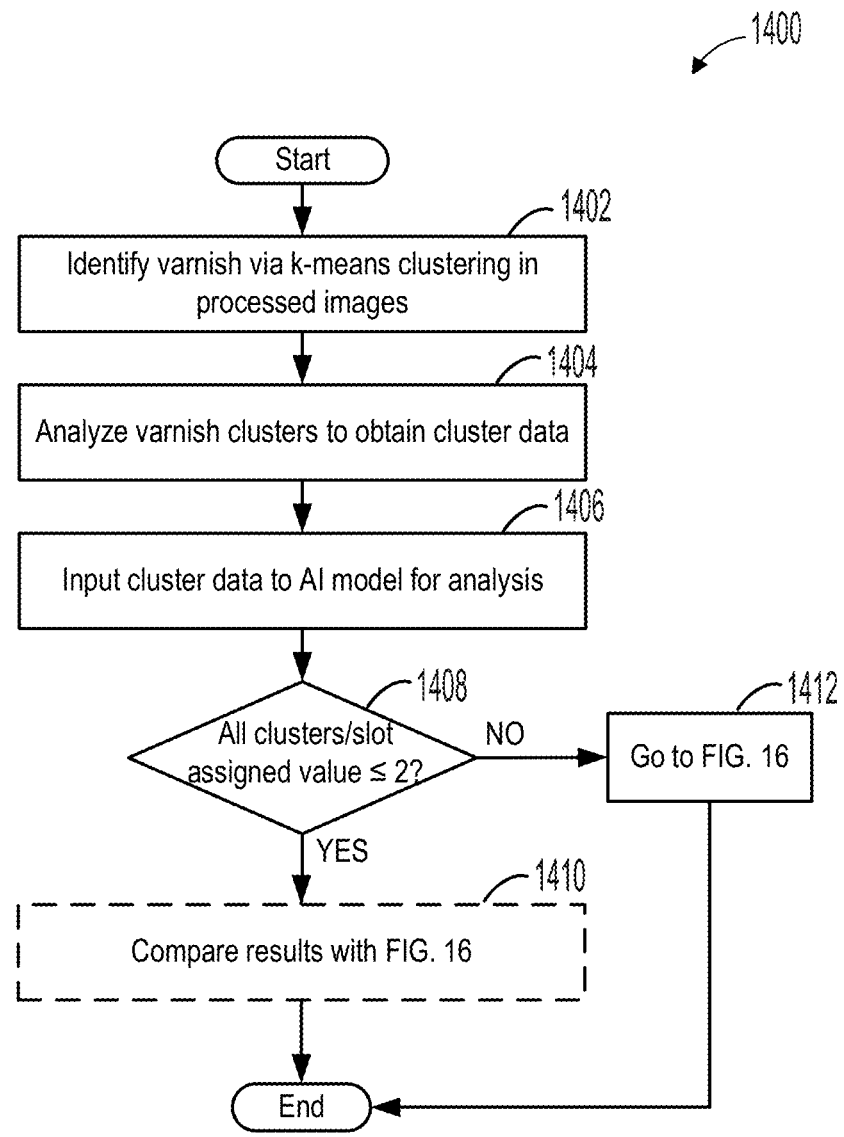
FIG. 14 shows an example of a method for training an AI model to estimate varnish fill percentage from images of axial sections of a stator using a second technique, where an output of the AI model is used to train the deep learning tool of FIG. 4.
Figure 15:
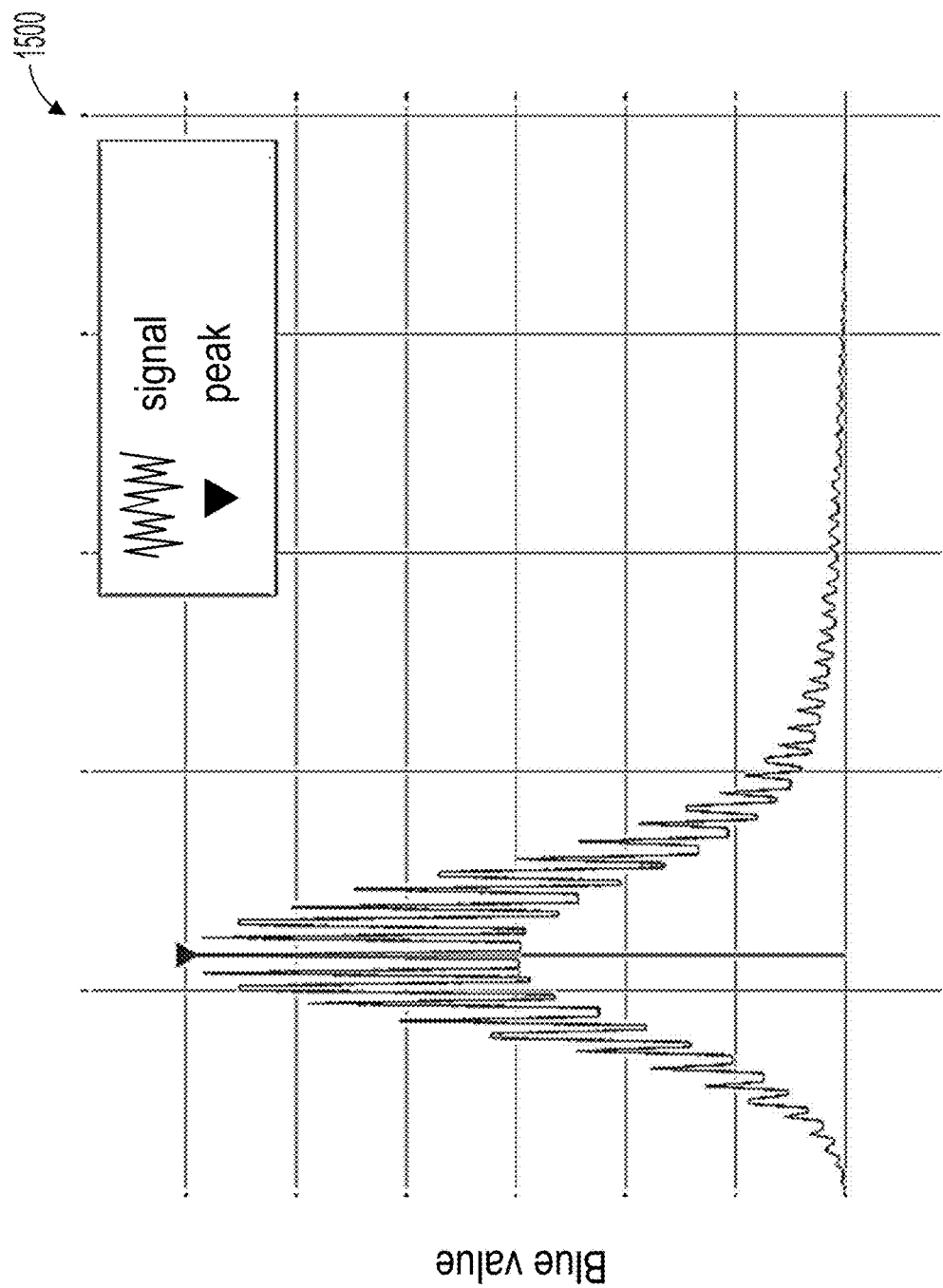
FIG. 15 shows an example of a plot of blue value for an image cluster used in the second technique of FIG. 14.
Figure 16:
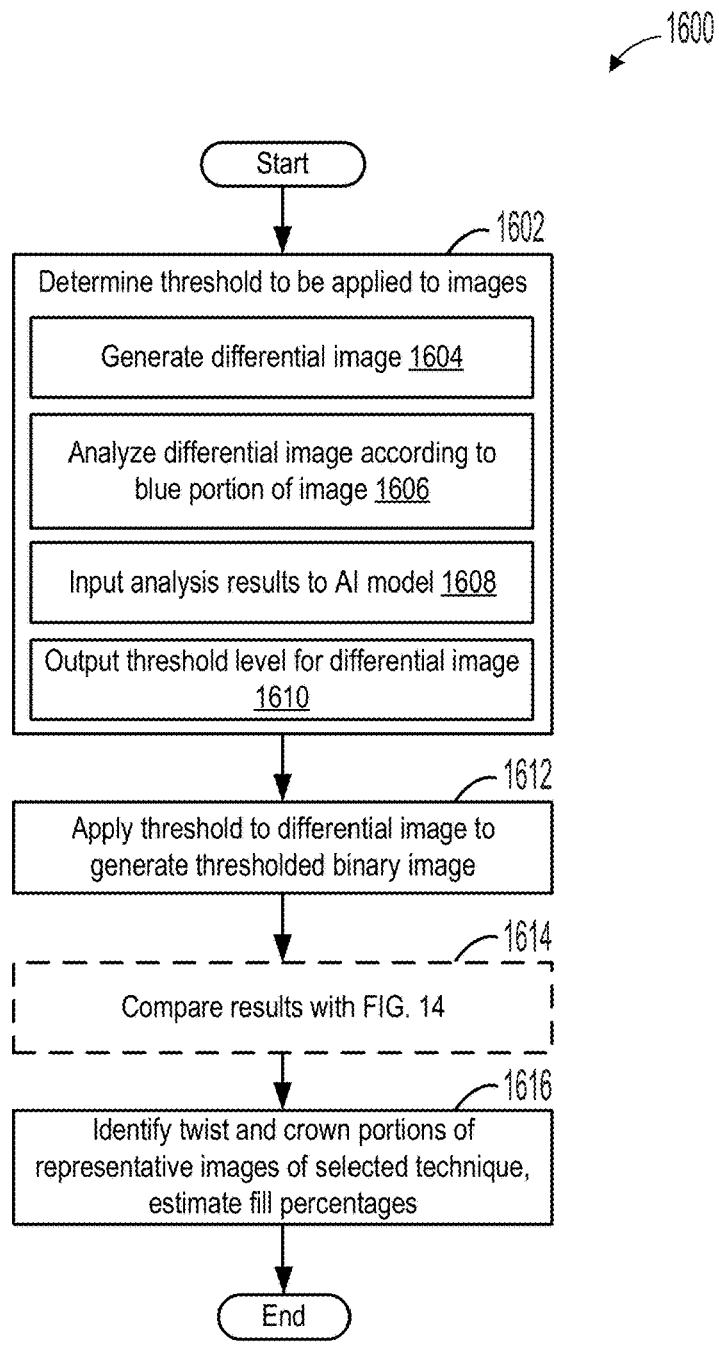
FIG. 16 shows an example of a method for training an AI model to estimate varnish fill percentage from images of axial sections of a stator using a third technique, where an output of the AI model is used to train the deep learning tool of FIG. 4.
Figure 17A:
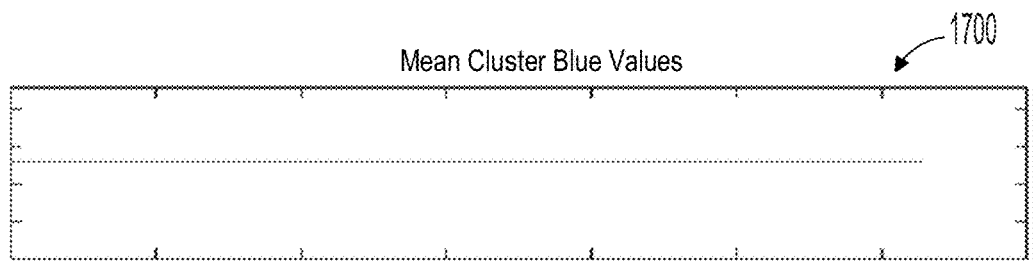
FIGS. 17A-17E shows a series of graphs plotting image parameters for the images according to the third technique of FIG. 16.
Figure 17B:
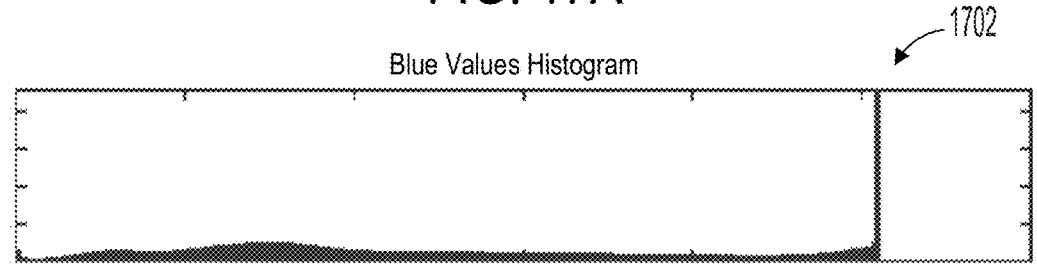
Figure 17C:
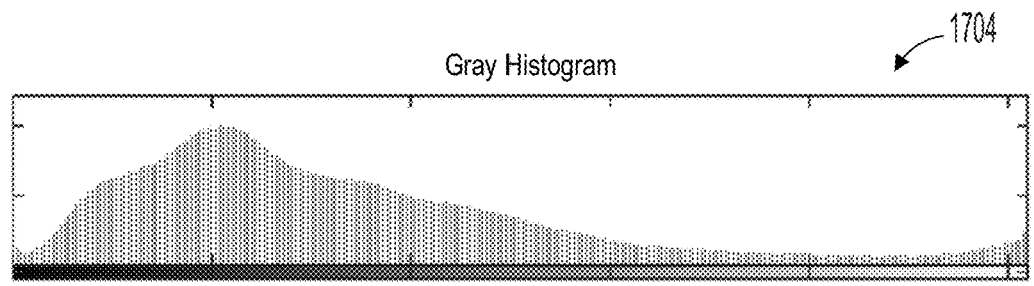
Figure 17D:
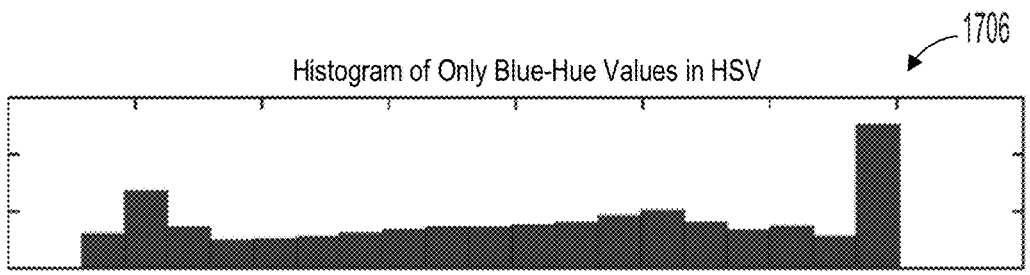
Figure 17E:
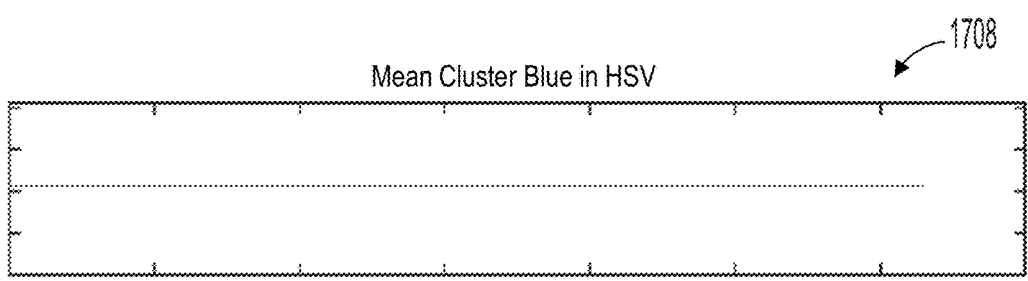
Figure 18A:
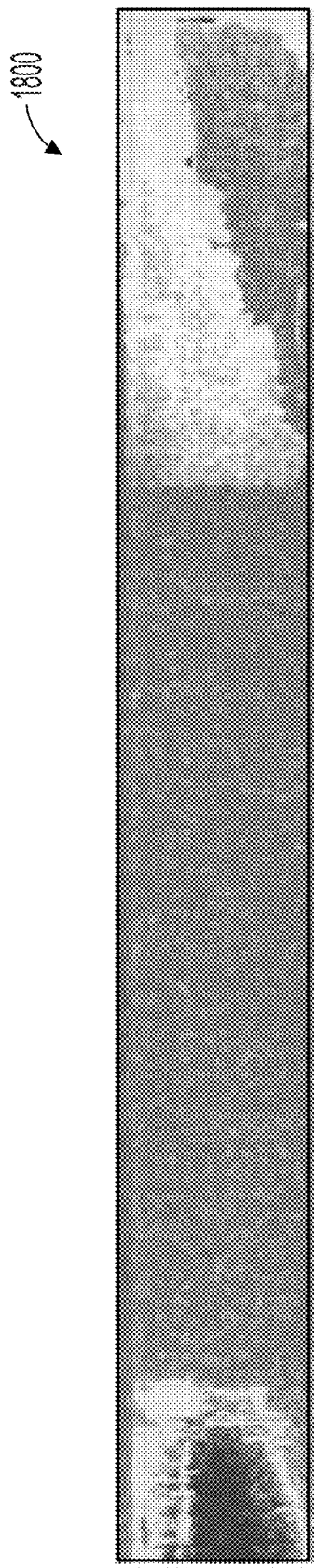
FIG. 18A shows a red, green, blue (RGB) color space differential image which may be used in the third technique of FIG. 16.
Figure 18B:
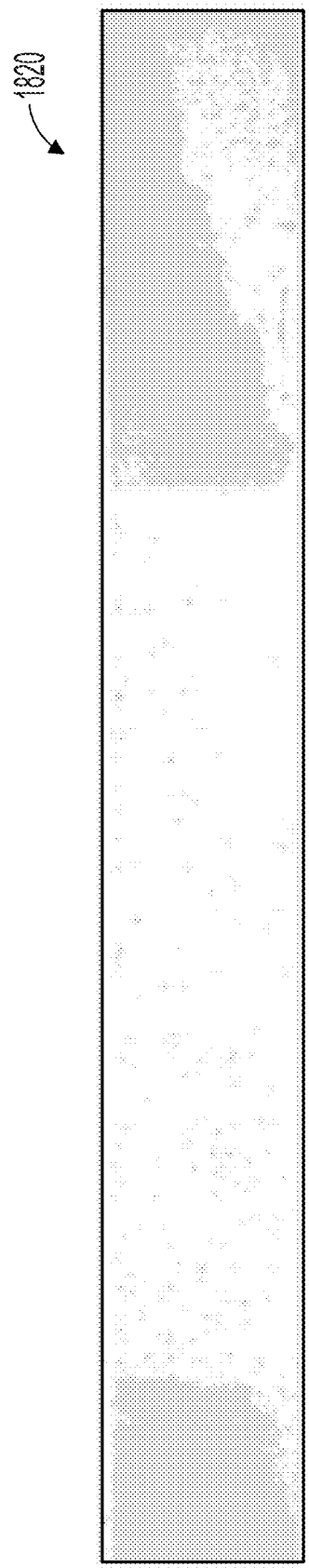
FIG. 18B shows a thresholded binary image generated from the differential image of FIG. 18A, which may be used in the third technique of FIG. 16.

An example of a method utilizing a second technique for training an AI model to identify voids in varnish based on the images of the axial cross-sections of the stator is depicted in FIG. 14. An output of the method of FIG. 14 may be used to train the deep learning tool. The second technique may also use color distribution analysis via k-mean clustering to process the images for analysis by the AI model. An example of analysis of an image cluster is shown in a plot of blue value for the image cluster in FIG. 15. Alternatively, the images of the axial cross-sections may be analyzed by an AI model trained via a third technique that also relies on color distribution analysis. An example of a method for using the third technique to train the AI model is shown in FIG. 16, which may rely on application of an image parameter threshold to create a binary mask. An output of the method of FIG. 16 may also be used to train the deep learning tool. Examples of image parameter data used in the third technique for estimating fill percentage are illustrated in FIGS. 17A-17E and an exemplary differential image generated from the application of the image parameter threshold, as well as an exemplary binary image created from processing of the differential image, are illustrated in FIGS. 18A and 18B, respectively.

Figure 1:
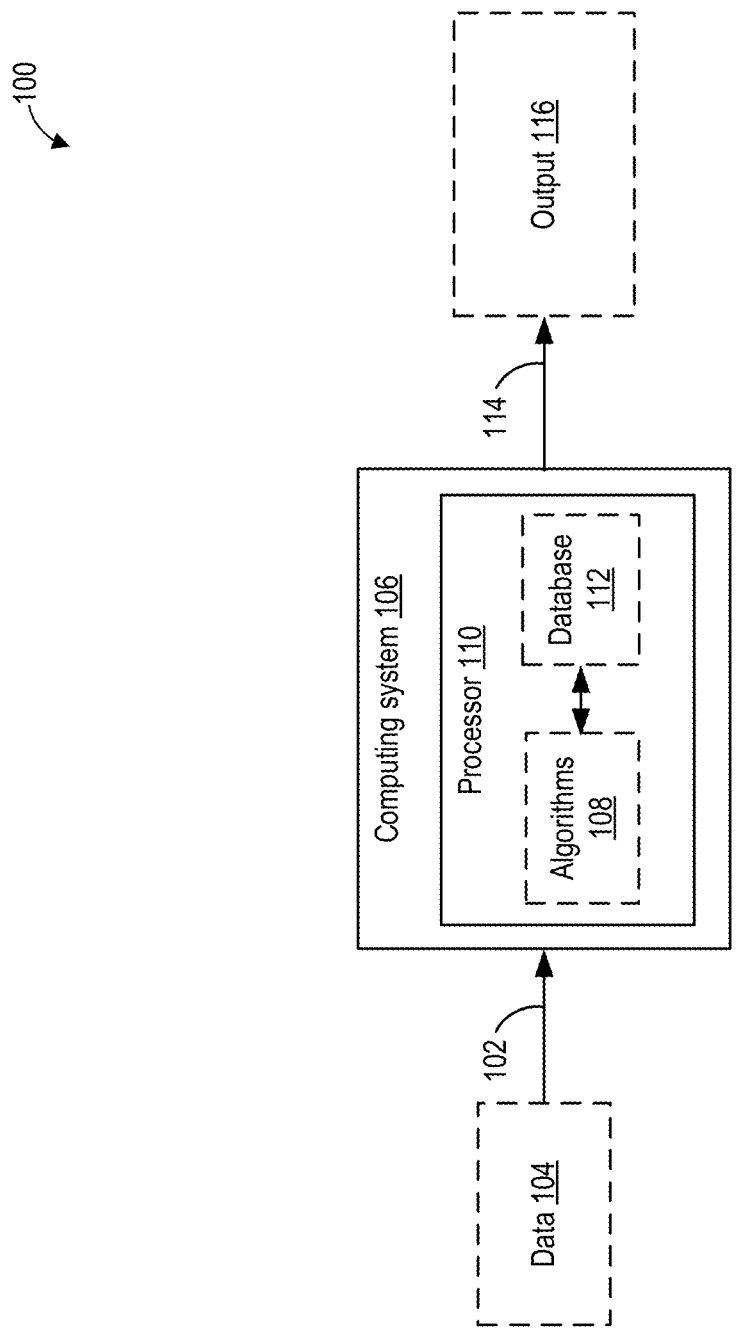
FIG. 1 shows a block diagram of a process for predicting a varnish condition of a stator.

A general process for utilizing image processing and AI algorithms for predicting a desired parameter, value, result, etc. is illustrated in FIG. 1 in a block diagram 100. Portions of the process corresponding to hardware components are depicted in solid lines while portions corresponding to data and algorithm-based components (e.g., software) are shown in dashed lines. The process may include, at step 102, inputting data 104 to a computing system 106. The data 104 may be acquired according to a format that allows the data to be recognized and manipulated by algorithms 108 implemented at a processor 110 of the computing system 106. It will be appreciated that the computing system 106 may include various other components, including hardware and software components not shown in FIG. 1 for brevity. In one example, as described further below, the data input to the computing system 106 may include images, such as visible light images (e.g., photographs) and fluorescence images.

The algorithms 108 may include a plurality of data processing algorithms stored at a memory, such as non-transitory memory, of the processor 110 and may provide instructions for manipulating, analyzing, and processing the data 104. For example, the algorithms 108 may include software for cropping images, matching images, aligning images, converting the images into different formats, etc. In addition, the algorithms 108 may include one or more AI-based models for automatically analyzing the images according to a target output 116. The AI-based models may utilize machine learning, including deep learning, to allow the AI-based models to be trained and continuously updated to generate the target output 116.

The computing system 106 may also include a database 112 storing information relevant to processing of the data 104 and at which at least some of the data 104 may be stored. In some examples, information stored at the database 112 may be used for training the AI-based models and for cross-correlation of the data 104 (e.g., newly input data) with the stored information. As such, the database 112 may initially have a quantity of training information that increases with time as more information is collected and input to the computing system 106. An accuracy of the AI-based models may therefore increase as the database grows.

As shown in FIG. 1, the algorithms 108 may provide an output that is displayed, via hardware of the computing system 106 (such as a display screen of a display device, for example) at step 114. The output 116 may be a visual representation of a prediction generated by the image processing algorithms, such as a graph, a table, an image, or combinations thereof. The output 116 may therefore include a visual display of predictions and estimates generated by the algorithms 108 that presents the output 116 in a comprehensive, concise, and/or traceable format to a user.

Figure 2A:
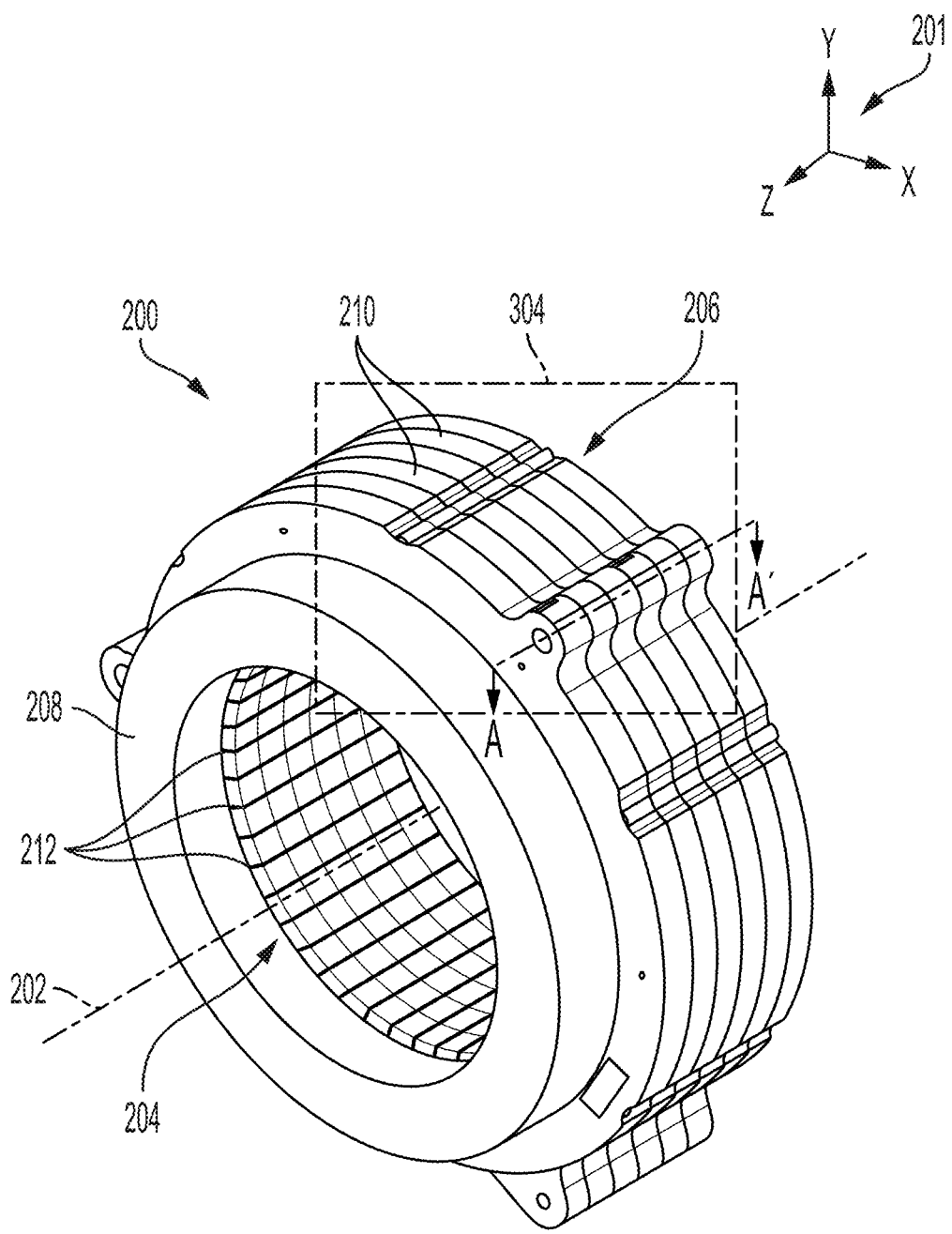
FIG. 2A shows a perspective view of an example of a stator which may include an insulation system coating windings of the stator.
Figure 2B:
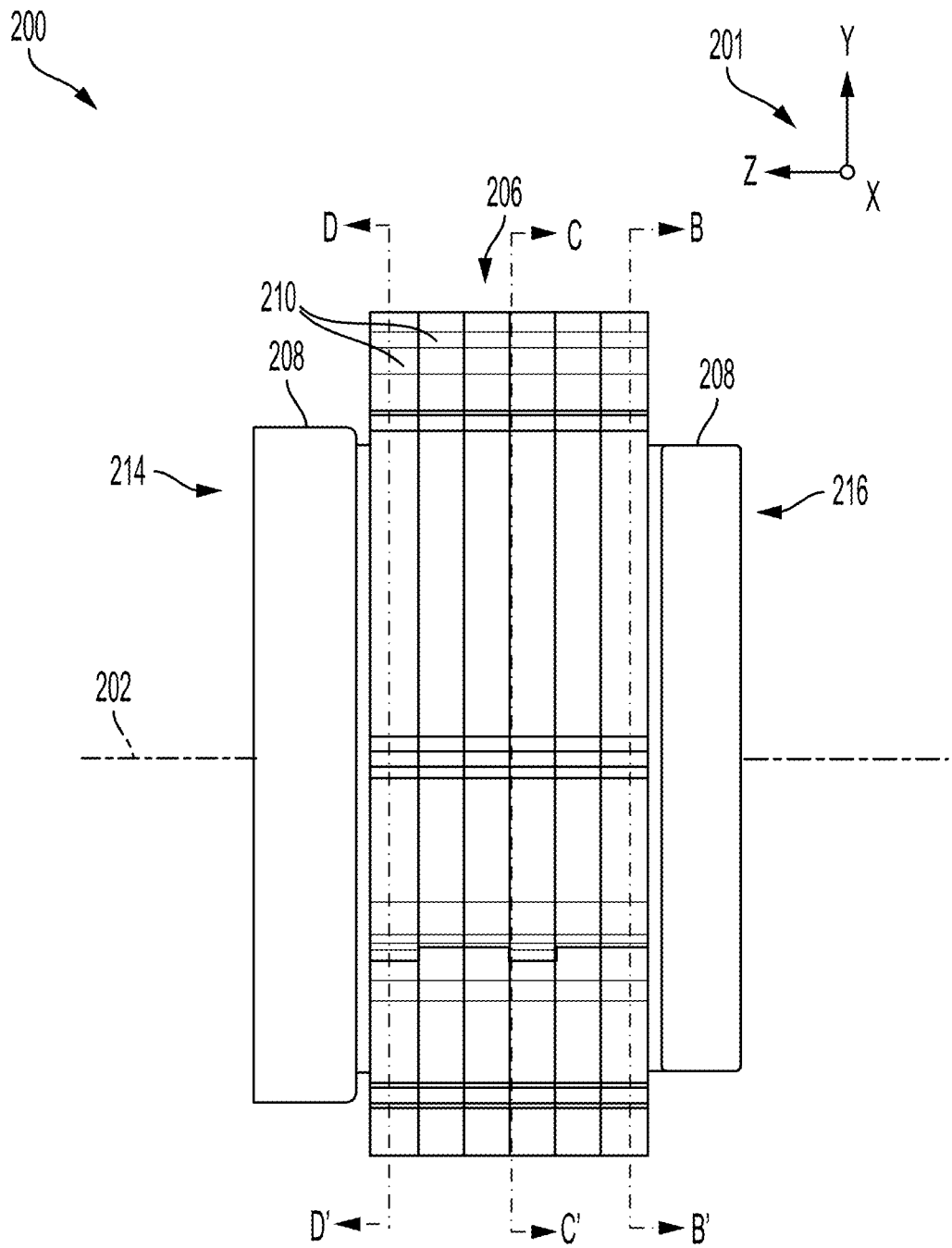
FIG. 2B shows a profile view of the stator of FIG. 2A.
Figure 3A:
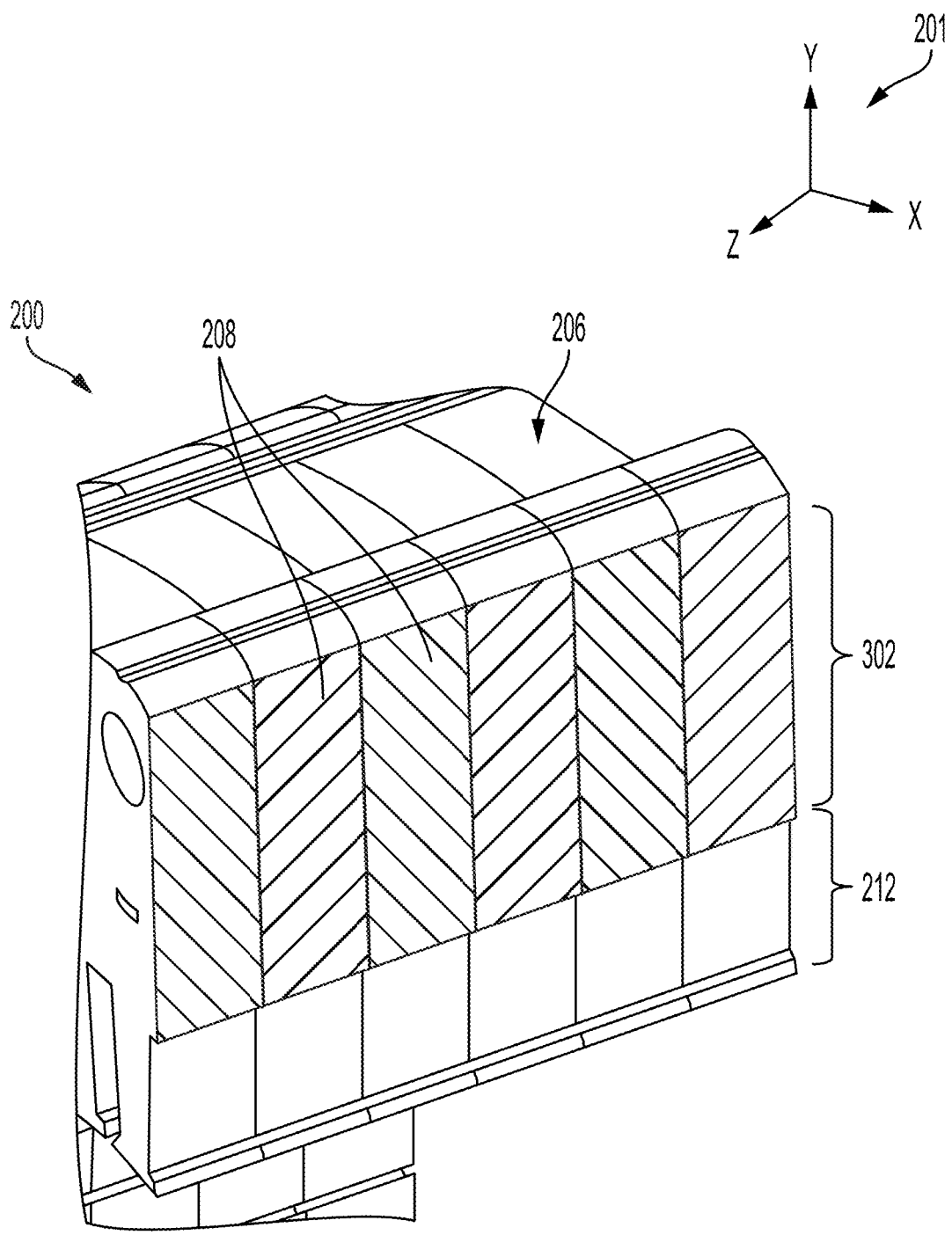
FIG. 3A shows a cross-sectional view of the stator of FIGS. 2A-2B, with windings of the stator omitted for clarity.
Figure 3B:
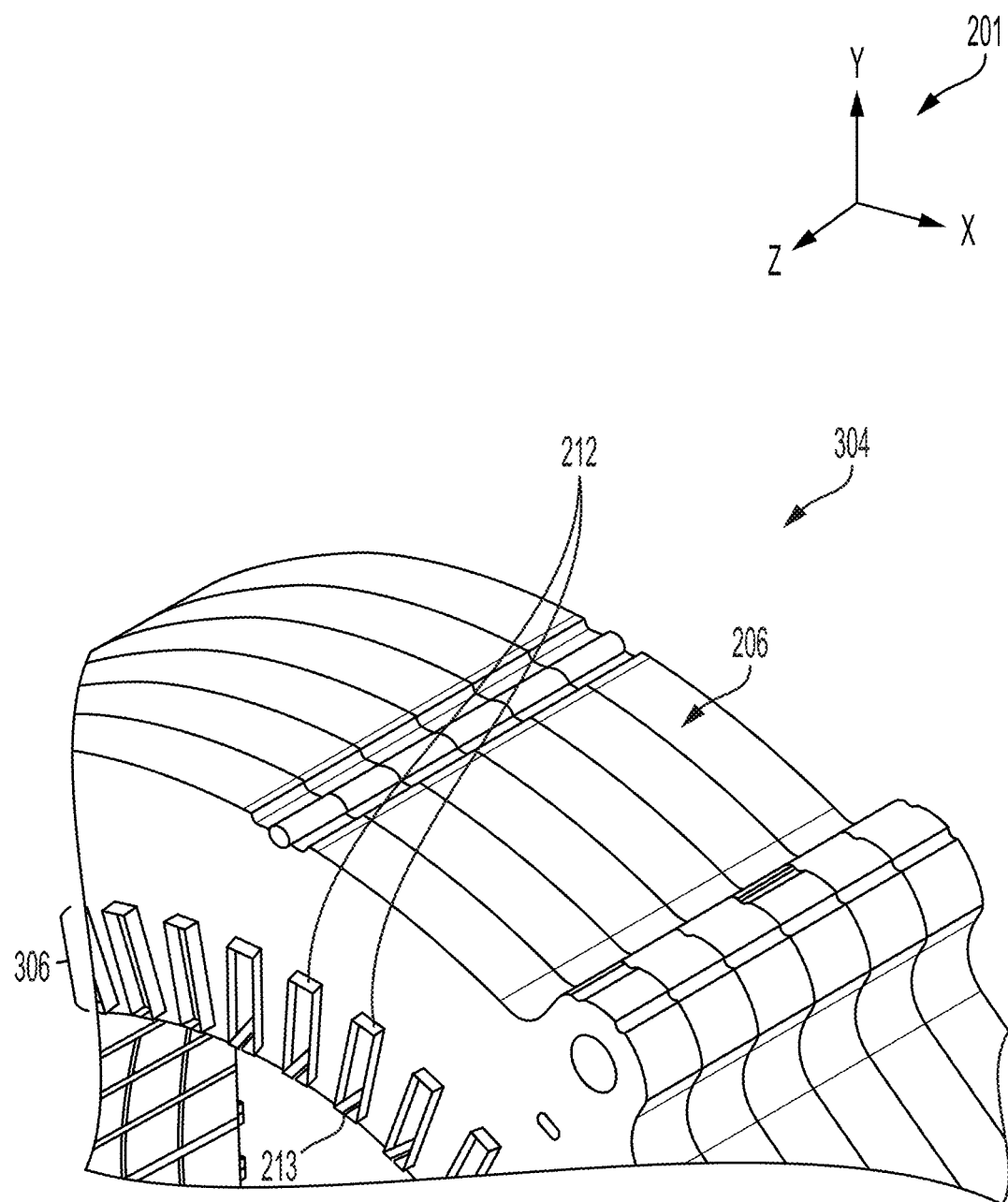
FIG. 3B shows a magnified view of a portion of the stator of FIGS. 2A-2B.

Turning now to FIGS. 2A-2B, an example of a stator 200 for an electric motor is depicted from a perspective view and a profile view, respectively. A set of references axes 201 is provided, including an x-axis, a y-axis, and a z-axis. The stator 200 has a cylindrical geometry with a central axis of rotation 202 that is aligned parallel with the z-axis, as well as an inner passage 204 extending entirely through a length of the stator 200, where the length is defined along the z-axis. When the electric motor is fully assembled, a rotor may be inserted through the inner passage 204 of the stator 200. It will be appreciated that the stator 200 shown in FIGS. 2A-2B is a non-limiting example and variations in a configuration of the stator 200, are possible without departing from the scope of the present disclosure.

The stator 200 has a core 206 formed of at least one durable, heat tolerant material. For example, the core 206 may have an exterior layer formed of stainless steel and an inner portion supporting copper conductors. For example, windings 208 may be coupled to the core 206, where the windings 208 may be formed of electrically conductive wires such as copper wires. When a potential is applied to the windings 208, current flow through the windings 208 may generate a first magnetic field in the stator 200. The first magnetic field may interact with a second magnetic field generated at a rotor positioned within the stator 200 and the interaction may cause the rotor to spin. The core 206 may be divided axially/longitudinally, e.g., along the central axis of rotation 202, into a plurality of sections 210, or laminations.

The core 206 may therefore be formed of the plurality of sections 210 stacked contiguously along the central axis of rotation 202, as shown in FIG. 3A in a cross-sectional view of the core 206, where the cross-section is taken along line A-A' of FIG. 2A. It will be noted that the windings are omitted in FIG. 3A for clarity. A cut portion 302 of the core 206 is indicated by hatching, which may be included an in outer region of the core 206 (e.g., relative to the central axis of rotation 202 of FIGS. 2A-2B), while an inner, uncut portion of the core 206 forms a side surface of one of a number of slots 212 disposed within the inner portion of the core 206.

The cutaway view of FIG. 3A shows that each of the plurality of sections 210 of the core 206 are similarly shaped and sized. The slot 212 extends into each of the plurality of sections 210 such that the slot 212 is formed along the entire length of the core 206. Returning to FIG. 2A, the slots 212 may be evenly distributed around the inner surface of the core 206. The windings 208 may be wound through the slots 212 such that the windings 208 are also distributed evenly around the core 206 and protrude from opposite ends of the core 206. For example, as illustrated in FIG. 2B, the windings 208 may extend beyond the core 206 along the central axis of rotation 202 at a first end 214 of the stator 200 and a second end 216 of the stator 200, the first end 214 opposite of the second end 216. In one example, the first end 214 may be a twist end of the windings 208 at which ends of the windings 208 are twisted together in pairs. At the second end 216, which may be a crown end of the windings 208, bends of the windings 208 may protrude from the core 206.

The slots 212 may each accommodate threading of a bundle of the windings 208 therethrough. A more detailed view of the slots 212, with the windings 208 omitted for clarity, is depicted in FIG. 3B. A portion of the stator 200 represented in FIG. 3B is indicated in FIG. 2A by dashed rectangle 304. As described above, the slots 212 are distributed evenly apart around an inner circumference of the core 206, extending from the inner surface of the core 206 into a portion of a thickness of the core 206, the thickness defined along a radial direction perpendicular to the central axis of rotation 202 (as shown in FIGS. 2A-2B). The slots 212 may be narrow in width, where the width is defined along the circumference of the core 206. As an example, the width of the slots 212 may be less than a distance between adjacent slots 212. Furthermore, the width of the slots 212 at the inner surface of the core 206, e.g., at a mouth 213 of each of the slots 212, may be narrower than a central region of the slots to retain a position of the windings 208 within the slots 212, thereby mitigating unwinding of the windings 208 through the mouth 213 of each of the slots 212. As a result of the narrowed mouths 213 of the slots 212, visual inspection of the windings 208 within the slots 212 may be obscured.

The stator may be configured with an insulation system for mitigating electrical shorting, providing a moisture barrier, and increasing a mechanical strength of the stator windings. In some examples, the insulation system may include insulating paper lining the slots of the core. The insulating paper may be positioned between the windings and surfaces of the core in the slots such that the windings do not directly contact the stator core within the slots. In other examples, however, a different material other than insulating paper may be used. Additionally or alternatively, the insulation system of the stator may include a coating applied to the windings, the coating composed of an insulating and encapsulating material, such as a varnish. The varnish may be added to the windings after the windings are wound through the slots of the core via methods such as dip-and-bake, trickle varnishing, vacuum pressure impregnation, etc. Gaps between surfaces of the slot and the insulating paper, and between the insulating paper and the windings, may be filled with varnish upon application. Regardless of application method, subsequent confirmation that the varnish has been applied to the windings as a uniform and continuous coating, as well as quantification of an amount of varnish in the slots, may be challenging.

For example, visual examination may not be feasible as the varnish may be a clear, colorless material and the coated windings within the stator slots may be obstructed from view. Electrical testing, such as insulation resistance tests, may confirm isolation between the stator core and phases (e.g., bundles of windings). The testing results may not indicate an amount of the varnish bonding components together, however, or, when the coating is determined to not be continuous, where a gap or voids in the coating may be located along the windings. In order to confirm that the coating is sufficiently thick and uniform to reliably withstand electric motor operating conditions over a desired period of time, thorough examination of the varnish may demand cutting a stator open to analyze the varnish within the stator slots. For example, cross-sectional areas of the stator may be illuminated with UV light to induce fluorescence of the varnish and allow capture of fluorescence images. Varnish may be identified and quantified by analysis of the fluorescence images.

Analysis of the fluorescence images may be performed via image processing software operated by a user. While the image processing software may allow detailed examination of the images, assignment of image parameters for identifying varnish and measurement of the varnish in the images is conducted by the user. A reproducibility of imaging analysis results may be low due to variability in irradiation of the cross-sectional areas, as well as in visual assessment of the images during varnish measurement, leading to poor consistency between analyses of different stator sections and between different users. Furthermore, sample preparation (e.g., slicing stators into sections), image acquisition, and processing of the images may be time-consuming and incur high costs.

The issues described above may be at least partially mitigated by implementing a deep learning tool for evaluating the varnish condition that reduces both variability in results and a duration of time to obtain the results. The deep learning tool may be trained using image analysis based on color distribution and/or machine learning to locate and quantify varnish in the images in a consistent and reproducible manner. In one example, the deep learning tool may comprise a CNN trained based on outputs from machine learning models and may further include image processing algorithms and deep learning algorithms for processing images, analyzing images based on color distribution analysis and cluster analysis to identify and quantify varnish in the images, as well as for converting analysis results into varnish fill percentages of the slots. The varnish fill percentages estimated using the deep learning tool may be presented to the user as a comprehensive visual representation, such as a table or chart reporting the fill percentage for each imaged slot. In addition, the strategy described herein enables detection of imaging differences undiscernible by the human eye, and enables data analysis and compilation at a resolution that may be unattainable within the visible spectrum of light.

An example of a method 400 for evaluating a varnish condition of a stator is shown in FIG. 4. Method 400, and the rest of the methods described herein, may be executed by a processor of a computing system, such as the processor 110 of FIG. 1. As shown in FIG. 1, the processor may be configured with image processing algorithms which may include both non-AI and AI algorithms. The stator may be a stator with a slotted inner surface, as shown in FIGS. 2A-3B, with windings wound through slots of the stator and the slots lined with insulating paper. Sections of the stator may be analyzed via method 400, the sections being either transverse sections, e.g., the stator is cut along planes perpendicular to a central axis of rotation of the stator, or axial sections, e.g., the stator is cut along a length of the stator, the length being parallel with the central axis of rotation. When cut transversely, the transverse images used for processing may be images of individual windings (e.g., wire conductors) of the stator rather than the stator core. The windings may be aligned along a linear axis in the transverse images for more efficient processing. When cut axially, the stator may be sliced through at least one of the slots, allowing side surfaces of the slot to be imaged. In other words, the transverse images show cross-sectional areas of the windings while the axial images show cross-sectional areas of the stator core, at the slots.

An example of an image of a transverse section of a stator is depicted in a first image 500 in FIG. 5 and an example of an image of an axial section of a stator is depicted in a second image 600 in FIG. 6. The first image 500 does not include the stator core and instead shows a plurality of conductors 502 of the stator. In contrast, the second image 600 shows a portion of the stator core that includes a surface of a slot 602. Further details of the first and second images 500, 600 are provided further below.

At 402, method 400 includes acquiring images of the stator sections at the slots. The images may include at least fluorescence image, obtained by irradiating the stator with UV light from a UV light source. A wavelength of UV light emitted from the UV light source may be selected based upon a predetermined target wavelength or wavelength range that induces fluorescence at the varnish. Absorption of UV light by the varnish may cause atomic excitation, followed by emission of light from the varnish, e.g., photoluminescence, at longer wavelengths than the incident light. As an example, the wavelength of the UV light may be between 350 nm and 450 nm while a wavelength of light emitted via fluorescence by the varnish may be between 400 nm and 475 nm.

In order to obtain reproducible analysis of the images, the images may be collected using consistent image acquisition settings at digital imaging equipment. In other words, any images obtained via the digital imaging equipment may be acquired using pre-set, uniform image acquisition settings. For example, a pre-set incidence wavelength, detection wavelength, focus, focal depth, lighting, incident wavelength angle, detector positioning, stator section orientation, etc., may be used for all imaging events for each stator section. In addition, in some examples, the stator section may be enclosed within a housing during imaging, with the housing configured to support and accommodate positioning of the UV light source therein. By enclosing the stator section and UV light source within the housing during image acquisition, adverse image effects from external lighting and contamination by debris may be circumvented.

At 404, method 400 includes feeding the acquired images to a deep learning tool. For example, the images may be temporarily stored in transient memory of the computing system and delivered to the processor for analysis by the image processing algorithms of the deep learning tool. Alternatively, the images may be stored at a database of the computing system and may be retrieved by user request to be transmitted to the image processing algorithms.

The deep learning tool may be trained via on training images output from one or more training techniques. The training techniques are described with reference to FIGS. 7, 11, 14, and 16, and may be directed to a specific type of image. For example, a first training technique depicted in FIGS. 7 and 11 may be used to train an AI model to identify and quantify voids in varnish extracted from transverse images. A second and a third training technique are shown, respectively, in FIGS. 14 and 16, which may be each be used to train an AI model to quantify an amount of varnish identified at a slot based on the axial images. Further details of the training techniques are provided further below.

By inputting the images to the deep learning tool at 404, the images may be segmented at 406 of method 400. For example, the deep learning tool may be trained to identify regions of the images corresponding to slots. In one example, the training of the deep learning tool to identify the slots may include comparing photographs of the slots to correlated fluorescence images and dividing the images into segments based on the comparison. Furthermore, the images may be segmented according to other identified regions of interest (ROIs). The other ROIs may include other areas of the stator at which varnish may be deposited.

Inputting the images to the deep learning tool may also allow the images to be cropped at 408 of method 400. For example, when the images are of transverse sections, as shown in FIG. 5, the images may be cropped to edges of insulating paper surrounding each of the windings in the images. Similarly, when the images are of axial sections, the images may be cropped to edges of the slot depicted in the images, thereby removing other regions of the stator core shown in the images. In other words, an image may be cropped by identifying borders of a slot depicted in the image and trimming the image to remove regions outside of the borders (e.g., regions not corresponding to the slot). The deep learning tool may be trained to identify the slots in the images, according to the type of stator section, and crop the images accordingly.

Inputting the images to the deep learning tool may further enable varnish to be identified in the images at 410 of method 400. As an example, the deep learning tool may include algorithms for extracting color signatures of varnish from the images to allow quantification of the varnish, relative to a cross-sectional area of the slot, and estimate varnish fill percentage for each slot of the images. For example, a CNN included in the deep learning tool may be trained to identify varnish based on a fluorescence signature of the varnish, allowing the deep learning tool to locate regions of varnish that may not be visually discernible to a user. The CNN may be trained based on outputs used as training data from machine learning models, where the machine learning models are trained according to color distribution analysis and cluster analysis. Training of the machine learning models may include applying color-based thresholding and generating binary masks that visually distinguish regions with varnish from regions without varnish. Details of the machine learning models are provided further below with reference to FIGS. 7-18B.

At 412, method 400 includes outputting a report with the estimated fill percentages. For example, the deep learning tool may convert results of analysis of the images for varnish, as described above with respect to 410 into numerical quantifications of the varnish. The report may be presented as a table, spreadsheet, etc., and may be displayed at a display device. An example of a report 1000 that may be output from the deep learning tool is illustrated in FIG. 10. In addition to the fill percentages for the slots, the report 1000 may further include information such as a slot number, surface area and varnish area of each slot, and fill percentages according to a portion of a slot, e.g., a twist, a central, or a crown portion of a slot. The portion of the slot may be determined based on reference to an image label, when the images of axial sections of the stator. For images of transverse sections of the stator, identification of the portion of the slot may depend on a relative positioning of a transverse section along a length of the stator. For example, a twist, a central, and a crown portion of the stator is indicated by lines D-D', C-C', and A-A', respectively, in FIG. 2B, which may have individual fill percentages in the report 1000. The surface area and varnish area of each slot may also be displayed in the report. Furthermore, the report may be generated in a file format that allows the report to be readily viewed, exported, and/or edited using various types of software.

As described above, the deep learning tool may be used to process both transverse sections and axial sections of the stator. Depending on the section type, the algorithms and techniques used to provide training data to train the deep learning tool may differ. For example, the first image 500 of the transverse section of the stator is shown in FIG. 5. The transverse section may be obtained by slicing the stator along one or more of the line B-B', the line C-C', and the line D-D' indicated in FIG. 2B. Slicing the stator along the first, second, and third lines may provide transverse section images at a crown end, a central region, and a twist end of the stator, respectively.

As depicted in FIG. 5, the first image 500 shows a plurality of conductors 502, which may be aligned along a radial direction relative to a central axis of rotation of a stator, within a slot of the stator. Each of the plurality of conductors 502 is a copper wire and may be spaced away from adjacent conductors by gaps 504. In other words, each of the gaps 504 is located between two of the plurality of conductors 502. The gaps 504 may be spaces between the plurality of conductors into which varnish may be deposited upon application to the stator. Further, the gaps 504 may extend along a portion of a thickness of the stator within an inner portion of the stator core. As an example, the inner portion is indicated by bracket 306 in FIG. 3B.

Insulating paper 506 surrounds the plurality of conductors 502, forming a continuous border around the plurality of conductors 502. As described above, the insulating paper may be arranged between outer surfaces of the plurality of conductors 502 and surfaces of the slot in which the plurality of conductors 502 are located. The outer surfaces of the plurality of conductors 502 may be surfaces that are perpendicular to surfaces bordering the gaps 504. Varnish may be present both in the gaps 504 between the plurality of conductors 502 and in spaces between outer surfaces of the plurality of conductors 502 and the insulating paper 506. The first image 500 may also depict voids in the varnish, shown as dark regions around the plurality of conductors 502 in FIG. 5. Identification and analysis of varnish around the plurality of conductors 502, e.g., by the deep learning tool, may therefore allow a relative amount of varnish coating the plurality of conductors to be estimated.

A second image 600 of a stator section is shown in FIG. 6, where the stator section is an axial section. For example, the axial section may be obtained by slicing a stator along a central axis of rotation of the stator, through a slot 602 of the stator. The stator section of FIG. 6 may be analogous to the cross-sectional view of the stator 200 of FIG. 3A with the slot 602 of FIG. 6 being similar to the slot 212 of FIG. 3A. The slot 602 therefore extends along a length of the stator with a cut portion 604 of the stator depicted above the slot 602. It will be noted that the second image 600 does not show an entire area of the cut portion 604 and insulating paper is removed from the slot 602. Varnish identified along a surface of the slot 602, e.g., by the deep learning tool, may therefore represent varnish filling gaps between the surface of the slot 602 and the insulating paper. The varnish identified in images of axial sections of the stator may therefore be analyzed to estimate fill percentages of the stator slots.

As described above, a deep learning tool may be used to estimate varnish fill percentages at slots of a stator based on analysis of stator section images. In one example, the deep learning tool may be trained based on images generated by trained AI models. The AI models may include AI algorithms, including methodologies for machine learning and deep learning, to train the AI models to predict a condition of at least a portion of an insulation system of the stator. The portion of the insulation system may be a coating of varnish at the stator slots, applied to windings of the stator, and the AI models may hereafter be referred to as insulation prediction models. In one example, the insulation prediction models may be machine learning models.

The stator section type, e.g., transverse versus axial, may provide distinct views, respectively, of the slots (e.g., either showing cross-sectional areas of the stator windings or a surface of the slots) as well as, for the transverse sections, of insulating paper lining the slots. As such, analysis of the images may rely on different techniques depending on the stator section type depicted in the images. In some examples, the training of the insulation prediction model may include image analysis using more than one technique followed by comparison of respective results to determine which technique provides more accurate results, as described further below.

Depending on whether the images are of transverse sections or of axial sections, application of the trained insulation prediction model to each section type may include accounting for differences in image processing and transformations of data. For example, processing and analysis of the transverse sections may be more complex owing to the presence of copper windings and insulating paper in the images, which may demand defining boundaries of the insulating paper around the windings. In order to accurately quantify the varnish in the images of the transverse sections, void detection and correction is conducted, adding to a complexity of image processing and analysis. Identification and estimation of varnish in the images of the axial sections of the stator may therefore present a more simplified and robust approach to automated varnish assessment. A first technique, a second technique, and a third technique, for training the insulation prediction model to output images used to train the deep learning tool, as described above, are depicted in FIGS. 7, 11, 14, and 16, respectively.

The first technique, which may rely on clustering analysis, may be applied to the images of the transverse section of the stator (e.g., to images depicting the conductors/windings). Prior to image analysis by the insulation prediction model, processing of the images, in addition to the processing described above with respect to method 400 of FIG. 4, may be demanded, using deep learning. For example, k-means clustering may be used to partition n observations into k clusters, where each observation n belongs to a cluster with a nearest mean. For execution of the first technique, the image processing performed based on algorithms of the insulation prediction model may include first using a deep learning algorithm to automatically crop the images. For example, a neural network such as Resnet 18 may be used as a basis for the deep learning algorithm to crop the images to edges of a plurality of conductors shown in images (e.g., the plurality of conductors 502 of FIG. 5). The processing of the images may also include applying a Gaussian filter to the cropped images prior to feeding the processed images to the insulation prediction model. By applying the Gaussian filter, the images may be blurred and smoothed to allow for more efficient processing.

An example of a method 700 is shown in FIG. 7 for estimating varnish fill percentages from images of transverse sections of a stator via a first technique implemented at a processor, e.g., the processor 110 of FIG. 1. An insulation prediction model used in the first technique may be trained via a method 1100 depicted in FIG. 11, using the processed images provided by method 700. At 702, after acquiring fluorescence images of the transverse sections of the stator and processing the images as described at 402 of FIG. 4, method 700 includes identifying clusters, e.g., data points aggregated together due to at least one similarity that is recognized by image processing algorithms, representing the varnish from the processed images. For example, the vectors in the processed images may be quantized to partition n observations in the processed images into k clusters, where each observation belongs to a cluster with a nearest mean. The processed images may thereby be converted to cluster-only images, using k-means clustering.

For example, to render the cluster more obvious, the processed images may be converted to hue saturation value (HSV) color space, an alternative representation of red, green, blue (RGB) color space. HSV clusters (which may be color-based clusters) may be located from the fluorescence images and converted to the cluster-only images. For example, as shown in FIG. 8, the HSV clusters may be plotted in a graph 800 of saturation relative to hue. The HSV clusters include a first cluster 802, a second cluster 804, and a third cluster 806. Each of the HSV clusters may be converted to a cluster-only image.

Deep learning algorithms implemented by the insulation prediction model may be used to identify which of the HSV clusters represents the varnish. For example, a series of graphs plotting image parameters based on one of the cluster-only images may be generated, as shown in FIGS. 9A-9E. A first input graph 900, as shown in FIG. 9A, of the series of graphs may be a histogram of a blue portion of the cluster-only image and a second input graph 902 of FIG. 9B may be a histogram of the cluster-only image in grayscale. The series of graphs may further include a third input graph 904 of FIG. 9C, which may depict a distribution of sub-cluster areas, a fourth input graph 906 of FIG. 9D, which may show a distribution of major axis lengths of the sub-clusters, and a fifth input graph 908 of FIG. 9E, which may show a distribution of aspect ratios of the sub-clusters. The series of graphs and/or data from the series of graphs may be generated and/or obtained and fed to the insulation prediction model at 704. Information from the HSV clusters may thereby be extracted by analyzing the clusters based on the image parameters depicted in FIGS. 9A-9E and the extracted information may be used to identify varnish in the fluorescence images.

The insulation prediction model may output a likelihood of the cluster (e.g., the cluster corresponding to the cluster-only image input to the model) being the varnish based on analysis of data from the series of input graphs at 706. The likelihood may be provided as a value from 0 to 1, as an example. The insulation prediction model may generate a matrix with multiple identification methods based on the image parameters plotted in FIGS. 9A-9E. An example of a matrix is shown below in Table 1 for the fluorescence image with the first cluster 802, the second cluster 804, and the third cluster 806 of FIG. 8.

TABLE 1

Matrix with identification methods for cluster-only image analysis.

| Cluster ID | Major Axis Length in Range? | Mean Blue Value for Entire Cluster | AI Generated Predictive Index |
|---|---|---|---|
| 1 | TRUE | 50.2708 | 1.0 |
| 2 | 0 | 26.9857 | 0.0 |
| 3 | 0 | 7.848 | 0.0 |

The results shown in Table 1 indicate that the first cluster 802 of FIG. 8 may correspond to varnish. The output of the insulation prediction model may therefore include a selected cluster-only image corresponding to the cluster identified as varnish.

Returning to FIG. 7, at 708, method 700 includes filling in gaps in a paper border of the selected cluster-only image. For example, a gap filling analysis of the selected cluster-only image may be performed. A border representing insulating paper lining the stator slots in the selected cluster-only image may be analyzed for continuity. Ensuring continuity of the insulating paper border in the selected cluster-only image may enable accurate detection of voids in the varnish cluster(s). In some instances, discontinuities in the insulating paper border may arise due to lighting issues and/or varnish penetration. A presence of discontinuities may be determined by generating a binary image from selected cluster-only and filling in the binary image from edges of the binary image to a center of the binary image. A discontinuity may be detected when a change in area between the initial binary image and the filled-in binary image is greater than an area of one of the conductors.

For example, filling in the gaps in the binary image may include applying a paper gap fill method that performs morphological closing at the binary image to produce a continuous border. At 710 of method 700, the filled-in binary image may be combined with the initial binary images by subtracting the initial binary image from the filled-in binary image and a resulting "gap" image may be filtered and added back to the original fluorescence image, creating a new, complete boundary in an adjusted fluorescence image incorporating the process described above. As a result, a paper fill mask is created, based on the images. Voids may be depicted in the paper fill mask.

The voids may be identified and evaluated at 712 of method 700. The void properties may be assessed and quantified, using the image processing algorithms, which may include determining a size of each void, an overall area of the voids and comparing the overall area of the voids to cross-sectional areas of the conductors. Data regarding the void properties, fill percentages as determined by the insulation prediction model, and relationships therebetween may be stored at a memory of the processor, or at a database. The data may be used as training data for training the deep learning tool to identify and quantify varnish, and estimate fill percentages based on the identified and quantified varnish.

Figure 11:
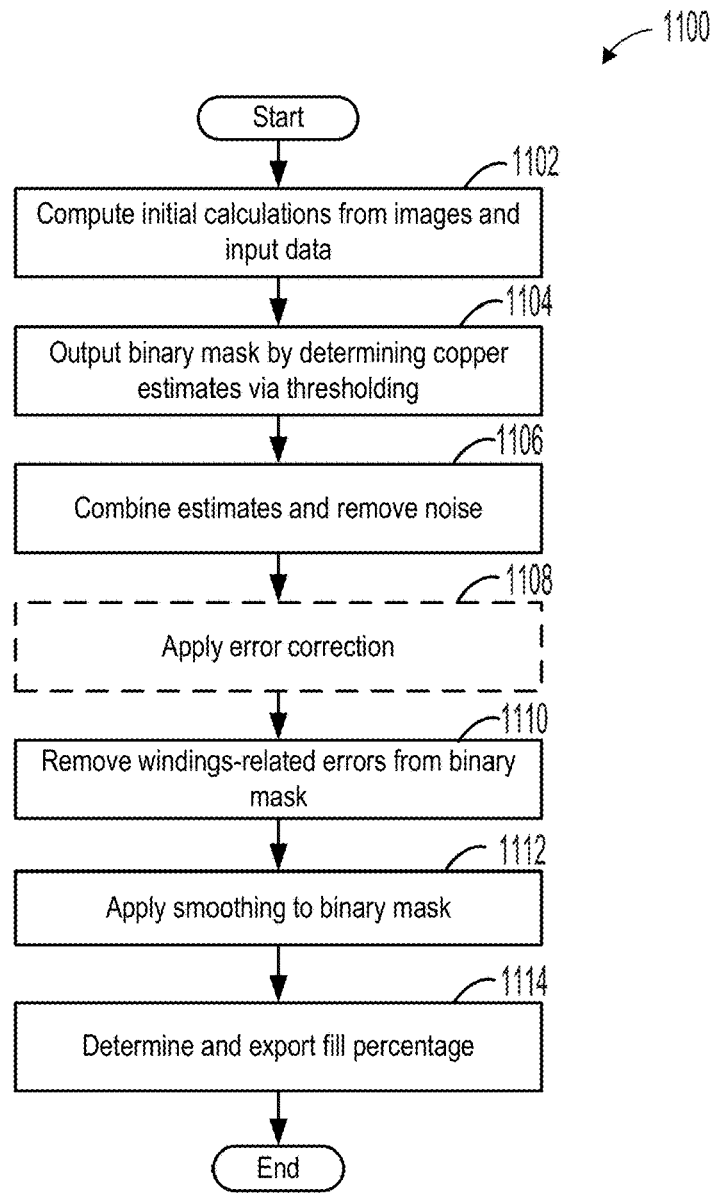
FIG. 11 shows an example of a method for training the AI model of FIG. 7, using the first technique, where an output of the AI model is used to train the deep learning tool of FIG. 4.

Turning now to FIG. 11, a method 1100 is shown which utilizes the first technique for training the insulation prediction model, the first technique relying on color distribution analysis of the processed images. The images delivered to the insulation prediction model in method 1100 may be processed as described above, e.g., using deep learning to crop and filter the images. At 1102, method 1100 includes inputting image data to the insulation prediction model, the input data corresponding to the images. The images may be converted to RGB/HSV color space. The input data may include a magnification of the input image, motor properties such as a number of windings per slot, a geometry of the windings, etc. Calculations are also performed at 1102, based on the input image and input data. For example, the windings geometry may be converted into a number of pixels and minimum and maximum areas of the windings may be estimated.

At 1104, method 1100 includes outputting a binary mask based on the input image by obtaining copper estimates via thresholding. The thresholding may be a color-based boundary applied to the input image to infer which regions of the input image correspond to copper (e.g., the conductors) to allow the binary mask to be generated. The binary mask depicts contrast between regions that are not attributable to copper, which may be assigned a value of zero, and regions that correspond to copper, which may be assigned a value of one.

As an example, an input image of a transverse section of stator, may be the first image 500 of FIG. 5. By processing the first image 500 as described above, a binary mask output 1200, as shown in FIG. 12, may be generated by the insulation prediction model. The binary mask output 1200 depicts copper regions 1202, corresponding to the plurality of conductors 502 of FIG. 5, in white and areas surrounding the copper regions 1202, where the surrounding areas are not formed of copper, in black. Generation of the binary mask therefore distinguishes between regions of different materials from an image, based on application of the thresholding, e.g., an assigned value for an image a parameter that is applied to the image.

For example, the thresholding may be set to a value representing a difference between red and green within the RGB color space in the processed image, such as 30. Any regions corresponding to a value greater than 30 may be displayed as white (indicating copper) in the binary mask while regions assigned values of 30 or less may be displayed as black in the binary mask. The thresholding may be decreased, causing the black regions to be converted to white as the threshold value decreases from 30. The white areas may be characterized based on number of pixels and area orientation as the threshold value is decreased. A resulting copper estimate may be used to determine if the thresholding value is suitable, e.g., based on training images. For example, if too few pixels, relative to a target number of pixels are attributed to copper in the copper estimate, the threshold value may be too high and if too many pixels, also relative to the target number of pixels, are attributed to copper in the copper estimate, the threshold value may be too low. The area orientation may be, as an example, within 20 degrees of a vertical axis of the stator.

The thresholding may be repeated a second time and a third time to obtain additional copper estimates. However, the second iteration of the thresholding may be set to a value representing a difference between red and blue and the third thresholding may be set to a value representing a threshold hue in the HSV color space. At 1106, method 1100 includes combining the copper estimates from the thresholdings and removing noise from a resulting combined copper estimate. The copper estimates may be combined by determining a running sum of the individual copper estimates and noise may be removed from the combined copper estimate by examining area properties. Determining the running sum may include assessing areas of the images based on pixel count (e.g., how many pixels are white which corresponds to copper) as well as orientation of the areas. As an example, if the pixel count is too low or too high relative to a known size of the respective conductor, then the pixel group may either not be copper or may be a poor estimate of copper.

For example, the running sum may be determined for each iteration of the thresholding as a sum generated as the threshold value is varied. Each threshold value may result in generation of a binary (black and white) image and the running sum may account for image variations due to non-uniform illumination, poor cross-sectioning, poor polishing, etc. By utilizing the running sum, an optimized result of the thresholding may be applied over all threshold values, which may mitigate spatial variations that may otherwise decrease an overall copper estimate provided by the binary image.

At 1108, method 1100 includes optionally re-analyzing the copper estimates and associated thresholding according to an error correction which may be triggered when a number of identified conductors does not match an expected number of conductors. In one example, the error correction may be a sequential process that includes, first re-analyzing the individual copper estimates (e.g., for each iteration), to determine which iteration included correct quantification of the number of conductors. If none of the estimations included correct quantification of the number of conductors, then identification of which of the expected conductors are missing in the estimations may be determined using hue-based thresholding to located the missing conductors according to expected positioning of the missing conductors. The positioning may be expected based on a geometry of the conductors. The hue-based threshold values may be adjusted based on adjacent detected conductors closest to the missing conductors.

If the hue-based thresholding does not successfully locate the missing conductors, then digital image cross-correlation (DICC) may be performed. In such instances, DICC may be used to track and measure how features or parts of a target object may vary between two images. For example, a most probable location of the missing conductors may be determined via DICC. A target sub-image of one of the identified conductors may be selected, cropped and correlated to a search area at which one of the missing conductors is expected to be found, on a pixel-by-pixel basis. A location of maximum correlation may be a predicted location of the missing conductor.

As an example, if an expected number of conductors is 8 and only 7 conductors are found in the copper estimates, DICC may be repeated for each of the 7 located conductors, using a different conductor of the 7 located conductors for the target sub-image, for each repetition. This may provide a closest match, with respect to the 7 located conductors, to the missing conductor to be used to find a location of the missing conductor.

At 1110, method 1100 includes removing errors related to the windings, such as extra-windings pixel errors and intra-windings pixel errors. For example, enamel masking may be used to mask out regions in the images corresponding to an enamel of the stator. The enamel masking may be extrapolated from masking of copper areas performed during generation of the binary mask and the enamel masking may be incorporated into the binary mask as shown in a first combined mask 1300 depicted in FIG. 13. Further, as shown in FIG. 13, a paper fill mask 1302, which may be generated at 706 of FIG. 7, is added to the first combined mask 1300. A resulting combined binary image 1304 may display voids 1306.

In addition, smoothing is applied to the images at the regions of the images corresponding to copper (e.g., windings) and/or the varnish at 1112 of FIG. 11. The smoothing may include removing observed voids sufficiently small to be deemed noise. The smoothing may also include mitigating occlusion of void detection arising from a presence of debris in the observed void regions by employing void correction. Void correction may include removing noise present in the combined binary image due to poor edge quality in the combined binary image may be removed. For example, a Savitzky-Golay filter may be applied to the voids to generate new boundaries around each of the voids, forming filtered masks for each of the voids. The filtered masks may be added to the combined binary image (e.g., the combined binary image 1304 of FIG. 13) generated at 1110 of FIG. 11 to produce a smoothed mask.

At 1114 of method 1100, the fill percentages of the varnish at each stator slot is determined and exported. For example, pixel areas may be summed in the smoothed mask for each of the images and converted to $mm^2$. Total void areas may be computed and the fill percentages determined based on the total void areas relative to the pixel areas.

In examples where images delivered to the deep learning tool, as depicted at 404 of FIG. 4, are images of axial sections of the stator (such as the second image 600 of FIG. 6), the second or the third technique for training the insulation prediction model may be used. As described above, images output from the insulation prediction model, as trained via the second or third techniques, may be used to train the deep learning tool (e.g., as shown in FIG. 4). The second technique may utilize k-means clustering to transform the images for color distribution analysis. The third technique may be a streamlined AI analysis that relies on image analysis in RGB color space, as well as generation of binary images with image parameter thresholds applied. As such, both techniques may leverage clustering analysis of the images to identify varnish.

Turning now to FIG. 14, an example of a method 1400 for training the insulation prediction model to estimate varnish fill percentage at stator slots according to the second technique is depicted. The method 1400 may be implemented at a processor, such as the processor 110 of FIG. 1. Prior to feeding the images (e.g., the images including at least fluorescence images) to the insulation prediction tool for training, the images may be processed via image processing algorithms of the second technique. For example, the images may be cropped using deep learning algorithms, as described above, thereby cropping the images to edges, e.g., shoulders, of a depicted slot of one of the images. In other words, cut portions of stator may be removed from the images such that only the slot is displayed in each of the images.

At 1402 of method 1400, varnish in the images may be identified by applying k-means clustering to the images after transforming the processed images. For example, the images may be converted to HSV color space, as described above with reference to method 700 of FIG. 7, and HSV clusters may be identified in the converted images, e.g., similar to the clusters shown in FIG. 8. The HSV cluster may be converted to cluster-only images and mean color values may be determined in the cluster-only images to identify varnish. As an example, clusters in the cluster-only image may be plotted as color value relative to a transect along each cluster and a mean value of the respective cluster may be estimated. In order for the clusters to be correlated to varnish, the mean values may be larger than an experimentally determined color value. A blue portion of the clusters confirmed to be varnish may be input to image processing algorithms of the second technique to generate masked images of the varnish clusters.

At 1404 of method 1400, the varnish cluster may be analyzed to obtain cluster data. For example, the varnish cluster distribution of blue values of the masked images may be determined and a shape, number, and position of peaks (e.g., peak distribution, peak location, etc.) in the distribution analyzed. For example, a graph 1500 is shown in FIG. 15 plotting a distribution of blue values relative to a transect along an area of a varnish cluster. A shape of the distribution, a number of peaks, and a relative position of the peak(s) may be analyzed and determined based on image processing algorithms. At 1406, method 1400 includes inputting resulting data from the analysis to the insulation prediction model for processing. Processing of the data of the clusters may include converting data for each cluster to a value between 0 and 10.

At 1408, method 1400 includes applying a prediction index threshold to assess a quality of the analysis. Applying the prediction index threshold includes determining if the data for each cluster of a slot are assigned a value less than or equal to 2. For example, clusters assigned values less than or equal to 2 may correspond to data of sufficient quality to confirm that the clusters are varnish, e.g., the data provides results that match ground truth data to a threshold extent. If all analyzed clusters for a slot are confirmed to be varnish, method 1400 continues to 1410 to compare the results from method 1400 to results from method 1600. Details of how the results are compared are described further below, with reference to 1614 of FIG. 16.

If, however, at least one of the analyzed clusters for a slot is assigned a value of greater than 2, an alternate method for varnish identification may be demanded and, at 1412, method 1400 proceeds to a method 1600 depicted in FIG. 16. The method 1600 may utilize the third technique for training the insulation prediction model to identify and quantify varnish in fluorescence images of axial sections of the stator.

Method 1600 of FIG. 16 may also be implemented at a processor, e.g., the processor 110 of FIG. 1, and rely on image processing algorithms and streamlined AI algorithms, e.g., a smaller set of algorithms demanding less processing power than, for example, the AI algorithms of methods 700, 100, and/or 1400, for execution. The images may be the processed images (e.g., cropped and filtered) used in method 1400 of FIG. 14. The processing may further include identifying a twist and/or crown end of the processed images for each slot by adding a label to one end of the slot of the processed images. At 1602, method 1600 includes determining a threshold to be applied to the processed images. By applying the threshold, e.g., a threshold level of an image parameter, varnish may be identified in the images. For method 1600, 1604 and 1606 represent additional processing steps applied to the processed images to prepare the processed images for delivery to the insulation prediction model at 1608.

For example, determining the threshold may include generating differential images at 1604. The differential images may be obtained by converting images of the axial sections of the stator to RGB color space to determine the threshold as a difference between red and green color spaces. The threshold may define a boundary enabling identification of varnish in the differential images. The differential images may be analyzed, at 1606, via color distribution analysis according to a blue portion of the images. Analysis of the blue portion of the images may include plotting the differential images according to parameters shown in FIGS. 17A-17E. For example, FIG. 17A shows a first plot 1700 of mean cluster blue values for one of the differential images, FIG. 17B shows a second plot 1702 of a blue values histogram of the differential image, FIG. 17C shows a third plot 1704 of a gray histogram of the differential image, FIG. 17D shows a fourth plot 1706 of a histogram of only blue-hue values in HSV color space, and FIG. 17E shows a fifth plot 1708 of mean cluster blue in HSV color space. The plots depicted in FIGS. 17A-17E may be generated using image processing algorithms.

At 1608, determining the threshold may further include inputting data from the cluster-only image, the data corresponding to the analysis results of 1606 to the insulation prediction model. In one example, the insulation prediction model may be configured with AI algorithms for performing random forests protocols, where random forests is an ensemble learning method for performing tasks by constructing decision trees during training. The tasks may include classification and regression, for example. The insulation prediction model may, at 1610 of method 1600, output a threshold for a contrast between red and green for the differential images. The threshold may define a pixel color boundary that differentiates between pixels corresponding to varnish and pixels not corresponding to varnish. The threshold may be a value between 0 and 20.

At 1612, method 1600 further processing of the differential images, using image processing algorithms, by applying the threshold to the differential images to generate thresholded binary images. An example of a differential image 1800 is illustrated in FIG. 18A, where the differential image 1800 is converted to RGB color space to show a difference between red and green. A thresholded binary image 1820, created by applying a threshold determined by the insulation prediction model to the differential image 1800, is shown in FIG. 18B. Pixels remaining from the differential image 1800 that are depicted in the thresholded binary image 1820 may be pixels with threshold group values less than the threshold output by the insulation prediction model. The remaining pixels (e.g., non-white pixels) may correspond to varnish.

At 1614, method 1600 includes, comparing the results of the third technique (e.g., as described with respect to method 1600) to the results of the second technique (e.g., as described with respect to method 1400 of FIG. 4). For example, varnish identification from the thresholded binary images of method 1600 may be compared to varnish identification from the cluster-only images of method 1400. As one example, a total area of blobs (e.g., groups of pixels with at least one shared property) for each of a cluster-only image and a thresholded binary image for a common slot of the stator may be quantified. An extent of the respective blob areas may be computed, where the extent is defined as a fill percentage of a blob area. An average extent of the blobs for each type of image may be estimated and a number of individual blobs for the cluster-only image may be compared to a number of individual blobs for the thresholded binary image. Furthermore, a value of a varnish quality index may be referenced to determine a resulting quality of the thresholded binary image or if an alternate process may be more suitable for estimating the varnish fill percentage.

For each of the images, any blob with less than a threshold number of pixels, such as 400 pixels, may be removed and a change in the respective image, relative to the image before removing the pixels, may be compared between the two image types. The AI methodology associated with the image, e.g., the cluster-only image or the thresholded binary image, that exhibits a least amount of change, as well as least overall area change, may be selected for continued evaluation and training. The continued evaluation may include comparing the extent of the selected image to an absolute value representing a difference in extent between the cluster-only image and the thresholded binary image to determine which methodology provides a better image, with respect to the varnish quality index. In other words, the continued evaluation determines which methodology provides a better prediction of varnish condition.

A representative image that demonstrates a least amount of noise from the selected image type, e.g., from the cluster-only images of the slots or the thresholded binary images of the slots, may be used for further processing according to method 1600. For example, noise in the images may be identified by changing the thresholding of images and/or increasing a blob size filter (e.g., varying the filter from 400 pixels), and observing how much image area disappears. The greater the noise in an image, the greater an area that may disappear under binary filtering to remove noise.

The further processing includes, at 1616, identifying twist and crown portions in the processed image, e.g., a portion of the processed image corresponding to a twist end of the stator and a portion of the training image corresponding to a crown end of the stator, where the processed image is one of the images of the axial sections corresponding to the representative image, after cropping and filtering the image and prior to generating the differential images.

The twist and crown portions may be identified by referring to the label applied to the images during processing, as described above. For example, the original image may include a label indicating the twist end of the slot which may be recognized by the image processing algorithms used in the third technique. An x-value of a centroid of the label indicating the twist end may be identified and applied to the representative image (e.g., a thresholded binary image or a cluster-only image). The centroid may be used to split the representative image into the two portions, with the portions identified as either the twist end or the crown end based on the label in the original image.

For each of the portions, a number of pixels corresponding to varnish (e.g., varnish pixels) may be summed and divided by a total number of varnish pixels and non-varnish pixels to obtain fill percentages of varnish corresponding to the twist end and the crown end of the slot. A fill percentage for the slot may be inferred by summing a total number of varnish pixels in the representative image and dividing the total number of varnish pixels by a total number of both varnish and non-varnish pixels in the representative binary image. Data regarding the varnish pixels and corresponding fill percentages may be stored at the processor's memory or a database and used as training data to train the deep learning tool to analyze and quantify varnish from images.

Images of axial sections of a stator may therefore be evaluated according to the second technique or the third technique during training of the insulation prediction model. During training, if the results of the second technique consistently do not provide unanimous threshold values less than or equal to 2 for all clusters of a slot, the third technique may be chosen as a more suitable technique for the insulation prediction model. In other examples, where the second technique does provide threshold values less than or equal 2 for all clusters, the fill percentages provided by the second technique and the fill percentages provided by the third technique for a common slot may be compared to identify which technique provides higher accuracy.

Detection and quantification of voids (e.g., void estimates) in the varnish coating stator windings may therefore be provided by processing and analysis of transverse section images of a stator while detection and quantification of varnish (e.g., varnish estimates) may be provided by processing and analysis of axial section images of the stator. The outputs from the insulation prediction model, after analysis of the images is executed, may be used to train the deep learning model. The deep learning model may be a simplified AI model in comparison to the insulation prediction model, allowing the deep learning model to be trained via results provided by use of processing-intensive algorithms of the insulation prediction model without demanding use of the processing-intensive algorithms during actual analysis of images in real-time. As a result, a processing time and burden may be reduced by using the deep learning tool rather than the insulation prediction model during processing of samples. However, a high accuracy of the deep learning tool may be enabled by training the deep learning tool based on a training dataset compiled from outputs of the insulation prediction model.

In this way, a condition of a varnish coating windings of a stator may be evaluated in an efficient and reliable manner. By tuning UV irradiation of stator cross-sections to wavelengths of light that induce fluorescence from the varnish, fluorescence images of the stator may be obtained. The images may be processed using image processing algorithms implemented at a processor of a computing system. Regions corresponding to the varnish may be readily located and quantified in the images by a deep learning tool trained to analyze fluorescence images for varnish. The deep learning tool may thereby recognize the regions corresponding to varnish and generate an estimate of a percentage fill of the varnish at each of the stator slots based on analysis of a fluorescence signature in the fluorescence images. The percentage fill may be presented to a user as a comprehensive report, such as a table or spreadsheet. The deep learning tool may be continuously updated as a database of images grows and accumulates additional images, thereby increasing a prediction accuracy of the deep learning tool. By leveraging deep learning to estimate varnish fill percentage, evaluation of the varnish condition may be automated, rapid, and reproducible, allowing the fill percentage to be determined within seconds rather than minutes or hours. For example, the time for image processing and generating a report may be reduced to less than 5 seconds. Furthermore, error and variability in fill percentage determination resulting from visual inspection of the images by the human eye may be reduced.

Furthermore, identification and analysis of voids in the fluorescence images may allow quality control of manufactured stators to become more efficient over time by configuring the model to determine a tendency for the varnish to be absent at recurring locations within the slots. Analysis of the images may be streamlined over time, for example, by evaluating regions of the slots where the varnish tends to be deposited at a lower resolution than regions of the slots where the varnish tends to be absent. More focused analysis of the image is thereby provided.

Overall, by identifying regions in the images corresponding to slots and cropping the images thereto, portions of the images that are not of interest, e.g., with respect to a presence of varnish, may be removed from the images prior to feeding the images to the deep learning tool. Processing of extraneous information is thereby precluded, allowing generation of estimated fill percentages to be achieved faster and with less processing power. A computational efficiency of the deep learning tool may be further increased by configuring the deep learning tool to generate binary masks and estimate voids from the processed images. Evaluation of vanish condition in a production facility is more efficient, allowing newly fabricated stators to be analyzed in real-time, thereby minimizing delays between production and distribution imposed by quality control procedures.

A technical effect of applying deep learning to predict a fill percentage of varnish at slots of a stator, based on fluorescence images of the slots, is that an estimation of a condition of the varnish is generated and presented to a user as a comprehensive visual representation that identifies locations of voids in the varnish. For example, the fluorescence images may be processed using deep learning to crop and modify the images to minimize a presence of image pixels not attributable to varnish and to align the images to allow the images to be converted to binary images. The binary images may be rapidly analyzed for varnish presence and fill extent using deep learning algorithms. Predictions provided by the deep learning algorithms may become increasingly accurate over time as a dataset for the model increases.

FIGS. 2A-3B show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. FIGS. 2A-3B are shown approximately to scale.

The disclosure also provides support for a method for automatically analyzing images of a stator, comprising: receiving images of the stator at a processor of a computing system, the images depicting cross-sections of the stator, processing the images using deep learning algorithms by cropping and filtering a region of the images corresponding to slots of the stator and converting the images to one or more of cluster-only images and binary masks, feeding the one or more of the cluster-only images and binary masks to an artificial intelligence (aI) model implemented at the processor, obtaining one or more of varnish estimates and void estimates from the aI model to generate a training dataset, and training a deep learning tool, based on the training dataset, to estimate varnish fill percentages from the images and display the varnish fill percentages at a display device. In a first example of the method, the cross-sections are one or more of transverse cross-sections, obtained by slicing the stator along one or more planes perpendicular to a central axis of rotation of the stator, and axial cross-sections, obtained by slicing the stator through at least one slot of the stator along the central axis of rotation of the stator. In a second example of the method, optionally including the first example, the transverse cross-sections depict cross-sectional areas of conductors of the stator, the conductors surrounded by insulating paper, and wherein the axial cross-sections depict a surface of the at least one slot. In a third example of the method, optionally including one or both of the first and second examples, converting the images to the cluster-only images includes applying k-means clustering to the images, and wherein applying k-means clustering includes converting the images to hue saturation value (HSV) color space and identifying clusters in the images. In a fourth example of the method, optionally including one or more or each of the first through third examples, a cluster-only image is generated for each of the clusters, and wherein feeding the cluster-only images to the AI model includes analyzing the cluster-only images for each of the clusters according to a plurality of image parameters and inputting analysis results from the analyzing to the AI model. In a fifth example of the method, optionally including one or more or each of the first through fourth examples, obtaining the void estimates from the AI model includes obtaining a cluster-only image corresponding to varnish as an output from the AI model and filling in gaps at a paper border of the output to create a continuous border at the paper border. In a sixth example of the method, optionally including one or more or each of the first through fifth examples, the method further comprises: generating a paper fill mask by applying the continuous border to a binary image, the binary image formed from the output from the AI model, to create a gap image, and wherein the gap image is combined with an original image of the images of the stator to generate the paper fill mask. In a seventh example of the method, optionally including one or more or each of the first through sixth examples, the paper fill mask includes voids, and wherein obtaining the void estimates includes assessing and quantifying properties of the voids. In a eighth example of the method, optionally including one or more or each of the first through seventh examples, converting the images to binary masks includes converting the images to red, green, blue (RGB) color space to generate a differential image and analyzing the differential image based on a plurality of image parameters. In a ninth example of the method, optionally including one or more or each of the first through eighth examples, obtaining the varnish estimates from the AI model includes inputting analysis results of the analyzing of the differential image to the AI model to obtain a threshold value, and wherein the threshold value defines a pixel color boundary that differentiates between pixels corresponding to varnish and pixels not corresponding to varnish.

The disclosure also provides support for a system for evaluating a varnish condition of a stator, comprising: a housing enclosing a UV light source and digital imaging equipment, and a processor configured with executable instructions stored in non-transitory memory that, when executed, cause the processor to: receive images of cross-sections of the stator from the digital imaging equipment, process the images using deep learning algorithms by cropping and filtering a region of the images displaying at least one slot and converting the images to converted images, the converted images being one or more of cluster-only images and binary masks, input the converted images to a machine learning model trained to identify varnish in the converted images based on one or more of color distribution analysis and cluster analysis of the converted images, output one or more of a varnish estimate and a void estimate from the machine learning model to generate a training dataset for a deep learning model, and train the deep learning model based on the training dataset to train the deep learning model to estimate varnish fill percentages based on the images and display the varnish fill percentages in a report at a display device. In a first example of the system, two training techniques are used to train the machine learning model to output the varnish estimate when the cross-sections are axial cross-sections of the stator, the axial cross-sections obtained by slicing the stator along a central axis of rotation of the stator, and wherein a first training technique of the two training techniques includes generating the cluster-only images, the cluster-only images depicting clusters, plotting blue values for the clusters to determine a peak location and a peak distribution of each of the clusters, and determining a total number of peaks of the cluster-only images. In a second example of the system, optionally including the first example, the machine learning model is trained to assign a value within an inclusive range of 0 to to each of the clusters, and wherein an assigned value of 2 or less indicates that a corresponding cluster represents varnish. In a third example of the system, optionally including one or both of the first and second examples, in a second training technique of the two training techniques, differential images are obtained from the converted images by plotting the cluster-only images in red, green, blue (RGB) color space showing a contrast between red and green color spaces, and wherein the differential images are analyzed based on a blue portion of the differential images and analysis results are input to the machine learning model. In a fourth example of the system, optionally including one or more or each of the first through third examples, the machine learning model is trained to determine a threshold value of a contrast between red and green, the threshold value being a value between and inclusive of 0 to 20, by applying random forests to data of the differential images, and wherein the machine learning model is further trained to apply the threshold value to the differential images to generate thresholded binary images, and wherein remaining non-white pixels in the thresholded binary images correspond to varnish. In a fifth example of the system, optionally including one or more or each of the first through fourth examples, the machine learning model is trained according to one of the two training techniques based on a comparison of results from the two training techniques applied to a common fluorescence image, and wherein the comparison of results includes determining a total area of blobs in each of a cluster-only image, the cluster-only image generated via a first training technique of the two training techniques, and a differential image, the differential image generated via a second training technique of the two training techniques. In a sixth example of the system, optionally including one or more or each of the first through fifth examples, the comparison of results further includes computing an extent and an average area of the blobs in each of the cluster-only image and the differential image, removing any blobs smaller than a threshold number of pixels from each of the cluster-only image and the differential image, and comparing a change in each of the cluster-only image and the differential image, and wherein one of the first training technique and the second training technique is selected that corresponds to which of the cluster-only image and the differential image exhibits a least amount of change. In a seventh example of the system, optionally including one or more or each of the first through sixth examples when the cross-sections are transverse cross-sections of the stator, obtained by slicing the stator perpendicular to a central axis of rotation of the stator, the machine learning model is trained using images converted to red, green, blue (RGB) color space and using image data input to the machine learning model, the image data including one or more of a magnification of the images, a number of windings per slot of the stator, and a geometry of the windings.

The disclosure also provides support for a method for evaluating a varnish condition of a stator, comprising: illuminating a cross-section of the stator with light from a UV light source, obtaining a fluorescence image of the cross-section via digital imaging equipment and transmitting the fluorescence image to a processor, processing the fluorescence image, at the processor, by cropping the fluorescence image to borders corresponding to one or more slots identified in the fluorescence image, converting the processed image using one or more of color distribution analysis and clustering analysis to create a converted image, inputting data from the converted image to a machine learning model implemented at the processor, the machine learning model trained to locate and quantify one or more of varnish and voids based on the converted image, generating a training dataset based on an output from the machine learning model and feeding the training dataset to a deep learning tool to train the deep learning tool to estimate a varnish fill percentage from the fluorescence image, and obtaining the varnish fill percentage from the deep learning tool and displaying the varnish fill percentage at a display device as a visual representation. In a first example of the method, the machine learning model is trained, when the cross-section is a transverse cross-section of the stator, by obtaining one or more copper estimates via comparison of a known quantity of conductors the converted image to an estimated quantity of conductors, applying an error correction and smoothing to the converted image and quantifying voids in the converted image, and wherein the converted image is a binary mask.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for automatically analyzing images of a stator, comprising:
receiving images of the stator at a processor of a computing system, the images depicting cross-sections of the stator;
processing the images using deep learning algorithms by cropping and filtering a region of the images corresponding to slots of the stator and converting the images to one or more of cluster-only images and binary masks;
feeding the one or more of the cluster-only images and binary masks to an artificial intelligence (AI) model implemented at the processor;
obtaining one or more of varnish estimates and void estimates from the AI model to generate a training dataset; and
training a deep learning tool, based on the training dataset, to estimate varnish fill percentages from the images and display the varnish fill percentages at a display device.

2. The method of claim 1, wherein the cross-sections are one or more of transverse cross-sections, obtained by slicing the stator along one or more planes perpendicular to a central axis of rotation of the stator, and axial cross-sections, obtained by slicing the stator through at least one slot of the stator along the central axis of rotation of the stator.

3. The method of claim 2, wherein the transverse cross-sections depict cross-sectional areas of conductors of the stator, the conductors surrounded by insulating paper, and wherein the axial cross-sections depict a surface of the at least one slot.

4. The method of claim 1, wherein converting the images to the cluster-only images includes applying k-means clustering to the images, and wherein applying k-means clustering includes converting the images to hue saturation value (HSV) color space and identifying clusters in the images.

5. The method of claim 4, wherein a cluster-only image is generated for each of the clusters, and wherein feeding the cluster-only images to the AI model includes analyzing the cluster-only images for each of the clusters according to a plurality of image parameters and inputting analysis results from the analyzing to the AI model.

6. The method of claim 5, wherein obtaining the void estimates from the AI model includes obtaining a cluster-only image corresponding to varnish as an output from the AI model and filling in gaps at a paper border of the output to create a continuous border at the paper border.

7. The method of claim 6, further comprising generating a paper fill mask by applying the continuous border to a binary image, the binary image formed from the output from the AI model, to create a gap image, and wherein the gap image is combined with an original image of the images of the stator to generate the paper fill mask.

8. The method of claim 7, wherein the paper fill mask includes voids, and wherein obtaining the void estimates includes assessing and quantifying properties of the voids.

9. The method of claim 1, wherein converting the images to binary masks includes converting the images to red, green, blue (RGB) color space to generate a differential image and analyzing the differential image based on a plurality of image parameters.

10. The method of claim 9, wherein obtaining the varnish estimates from the AI model includes inputting analysis results of the analyzing of the differential image to the AI model to obtain a threshold value, and wherein the threshold value defines a pixel color boundary that differentiates between pixels corresponding to varnish and pixels not corresponding to varnish.

11. A system for evaluating a varnish condition of a stator, comprising:
a housing enclosing a UV light source and digital imaging equipment; and
a processor configured with executable instructions stored in non-transitory memory that, when executed, cause the processor to:
receive images of cross-sections of the stator from the digital imaging equipment;
process the images using deep learning algorithms by cropping and filtering a region of the images displaying at least one slot and converting the images to converted images, the converted images being one or more of cluster-only images and binary masks;
input the converted images to a machine learning model trained to identify varnish in the converted images based on one or more of color distribution analysis and cluster analysis of the converted images;
output one or more of a varnish estimate and a void estimate from the machine learning model to generate a training dataset for a deep learning model; and
train the deep learning model based on the training dataset to train the deep learning model to estimate varnish fill percentages based on the images and display the varnish fill percentages in a report at a display device.

12. The system of claim 11, wherein two training techniques are used to train the machine learning model to output the varnish estimate when the cross-sections are axial cross-sections of the stator, the axial cross-sections obtained by slicing the stator along a central axis of rotation of the stator, and wherein a first training technique of the two training techniques includes generating the cluster-only images, the cluster-only images depicting clusters, plotting blue values for the clusters to determine a peak location and a peak distribution of each of the clusters, and determining a total number of peaks of the cluster-only images.

13. The system of claim 12, wherein the machine learning model is trained to assign a value within an inclusive range of 0 to 10 to each of the clusters, and wherein an assigned value of 2 or less indicates that a corresponding cluster represents varnish.

14. The system of claim 12, wherein in a second training technique of the two training techniques, differential images are obtained from the converted images by plotting the cluster-only images in red, green, blue (RGB) color space showing a contrast between red and green color spaces, and wherein the differential images are analyzed based on a blue portion of the differential images and analysis results are input to the machine learning model.

15. The system of claim 14, wherein the machine learning model is trained to determine a threshold value of a contrast between red and green, the threshold value being a value between and inclusive of 0 to 20, by applying random forests to data of the differential images, and wherein the machine learning model is further trained to apply the threshold value to the differential images to generate thresholded binary images, and wherein remaining non-white pixels in the thresholded binary images correspond to varnish.

16. The system of claim 12, wherein the machine learning model is trained according to one of the two training techniques based on a comparison of results from the two training techniques applied to a common fluorescence image, and wherein the comparison of results includes determining a total area of blobs in each of a cluster-only image, the cluster-only image generated via a first training technique of the two training techniques, and a differential image, the differential image generated via a second training technique of the two training techniques.

17. The system of claim 16, wherein the comparison of results further includes computing an extent and an average area of the blobs in each of the cluster-only image and the differential image, removing any blobs smaller than a threshold number of pixels from each of the cluster-only image and the differential image, and comparing a change in each of the cluster-only image and the differential image, and wherein one of the first training technique and the second training technique is selected that corresponds to which of the cluster-only image and the differential image exhibits a least amount of change.

18. The system of claim 11, wherein, when the cross-sections are transverse cross-sections of the stator, obtained by slicing the stator perpendicular to a central axis of rotation of the stator, the machine learning model is trained using images converted to red, green, blue (RGB) color space and using image data input to the machine learning model, the image data including one or more of a magnification of the images, a number of windings per slot of the stator, and a geometry of the windings.

19. A method for evaluating a varnish condition of a stator, comprising:

illuminating a cross-section of the stator with light from a UV light source;

obtaining a fluorescence image of the cross-section via digital imaging equipment and transmitting the fluorescence image to a processor;

processing the fluorescence image, at the processor, by cropping the fluorescence image to borders corresponding to one or more slots identified in the fluorescence image;

converting the processed image using one or more of color distribution analysis and clustering analysis to create a converted image;

inputting data from the converted image to a machine learning model implemented at the processor, the machine learning model trained to locate and quantify one or more of varnish and voids based on the converted image;

generating a training dataset based on an output from the machine learning model and feeding the training dataset to a deep learning tool to train the deep learning tool to estimate a varnish fill percentage from the fluorescence image; and obtaining the varnish fill percentage from the deep learning tool and displaying the varnish fill percentage at a display device as a visual representation.

20. The method of claim 19, wherein the machine learning model is trained, when the cross-section is a transverse cross-section of the stator, by obtaining one or more copper estimates via comparison of a known quantity of conductors the converted image to an estimated quantity of conductors, applying an error correction and smoothing to the converted image and quantifying voids in the converted image, and wherein the converted image is a binary mask.

* * * * *